United States Patent
Sakai et al.

(10) Patent No.: US 7,149,000 B1
(45) Date of Patent: Dec. 12, 2006

(54) APPARATUS FOR RECORDING TWO-DIMENSIONAL CODE AND HUMAN-READABLE DATA ON PRINT MEDIUM

(75) Inventors: Kenichiro Sakai, Kawasaki (JP); Tsugio Noda, Kawasaki (JP); Fumitaka Abe, Kawasaki (JP); Shoji Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/562,970

(22) Filed: May 3, 2000

(30) Foreign Application Priority Data

Jun. 3, 1999 (JP) ................................. 11-156209

(51) Int. Cl.
*G06K 15/00* (2006.01)

(52) U.S. Cl. ...................................... 358/3.28; 358/2.1

(58) Field of Classification Search ............... 358/3.28, 358/1.9, 3.24, 2.1; 382/287, 289–300
See application file for complete search history.

(56) References Cited

U.S. PATENT DOCUMENTS

| | | | | |
|---|---|---|---|---|
| 5,530,759 A | * | 6/1996 | Braudaway et al. | 380/54 |
| 5,713,032 A | * | 1/1998 | Spencer | 715/515 |
| 6,268,866 B1 | * | 7/2001 | Shibata | 358/3.28 |
| 6,345,104 B1 | * | 2/2002 | Rhoads | 382/100 |
| 6,449,377 B1 | * | 9/2002 | Rhoads | 382/100 |
| 6,600,571 B1 | * | 7/2003 | Ito | 358/1.15 |

FOREIGN PATENT DOCUMENTS

JP 6-343132 12/1994

* cited by examiner

*Primary Examiner*—Thomas D. Lee
*Assistant Examiner*—Stephen Brinich
(74) *Attorney, Agent, or Firm*—Staas & Halsey LLP

(57) ABSTRACT

A print information processing system includes a print data recording apparatus and a print data reproducing apparatus. In the print data recording apparatus, a human-readable image generation unit generates a human-readable image representing first data, and a two-dimensional code image generation unit generates a two-dimensional code image representing second data. A print data generation unit combines the human-readable image and the two-dimensional code image to generate print data, and a printing unit prints the print data on a print medium. In the print data reproducing apparatus, a reading unit reads the two-dimensional code image included in the print data printed on the print medium, and a print data decoding unit decodes the two-dimensional code image read by the reading unit, to reproduce the second data.

24 Claims, 24 Drawing Sheets

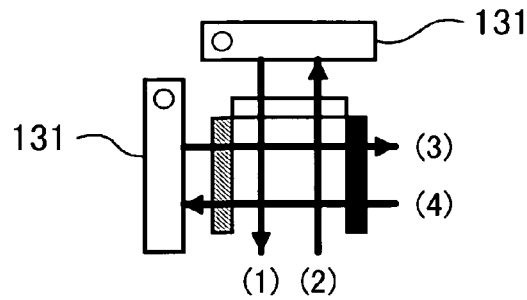
FIG.19 (A)
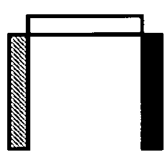 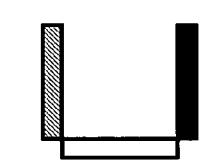 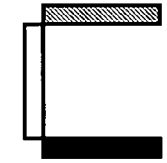 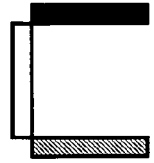
(1) FROM TOP TO BOTTOM | (2) FROM BOTTOM TO TOP | (3) FROM LEFT TO RIGHT | (4) FROM RIGHT TO LEFT
FIG.19 (B)  FIG.19 (C)  FIG.19 (D)  FIG.19 (E)
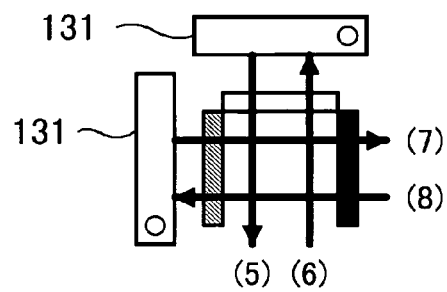
FIG.19 (F)
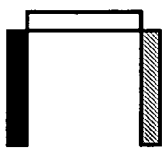 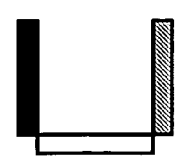 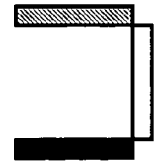 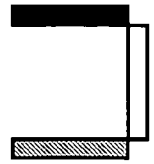
(5) FROM TOP TO BOTTOM | (6) FROM BOTTOM TO TOP | (7) FROM LEFT TO RIGHT | (8) FROM RIGHT TO LEFT
FIG.19 (G)  FIG.19 (H)  FIG.19 (I)  FIG.19 (J)

APPARATUS FOR RECORDING TWO-DIMENSIONAL CODE AND HUMAN-READABLE DATA ON PRINT MEDIUM

BACKGROUND OF THE INVENTION

1) Field of the Invention

The present invention relates to a print information processing system which processes information for printing the information in the form of a human-readable image and a machine-readable code image on a print medium, and reproducing original information represented by the machine-readable code image printed on the print medium.

2) Description of the Related Art

Generally, contents of printed matters such as books, newspapers, magazines, and the like can be recognized by readers based on printed data. Conventionally, only human-readable data, which are visually recognizable, are printed in printed matters for providing readers with information. That is, data printed on books, magazines, and the like are characters, figures, photographs, and the like. Although a one-dimensional bar code may be printed on covers of books, the one-dimensional bar code are used for representing commodity codes, and not used for providing readers with information.

However, in the case where the printed matters are teaching materials or dictionaries, readers of the printed matters may wish to listen to pronunciation of a printed word, or hear voice of a bird in a photograph printed in a printed matter. In addition, it is preferable that an explanation on movement of machines or planets is accompanied by a moving picture indicating the movement. Further, when a monochrome photograph is printed in a printed matter, a user may wish to see a colored image of the photograph.

Conventionally, when sound or a moving picture is required in a printing matter in addition to printed information, a recording medium storing data of the sound or the moving picture, such as a cassette tape, a CD (compact disk), and a videotape, is attached to the printing matter.

In the conventional electronic dictionaries, electronic books, or the like, specific characters or pictographs may be each linked with other text data, sound data, image data, or the like. Since these data linked with the specific characters or pictographs in the electronic dictionaries, electronic books, or the like are digitized, users can easily reproduce and refer to the linked data.

On the other hand, digital data can be printed in the form of a machine-readable code. A typical example is the one-dimensional bar code, which is comprised of a series of lines and represents data by combination of thicknesses of the respective lines and spaces between the lines. The one-dimensional bar code is mainly used for representing control data which are needed in circulation of commodity or merchandise control.

However, since the amount of data which can be represented by a one-dimensional bar code is very small, it is not possible to represent a great amount of data such as sound data. On the other hand, two-dimensional codes are known as machine-readable codes which can represent a great amount of data. The two-dimensional codes are comprised of, for example, an array of black and white squared dots forming a matrix, and can represent a greater amount of data in a small area, compared with the one-dimensional bar code. Therefore, data which can be represented by the two-dimensional codes are not limited to the control data in circulation of commodity or merchandise control. That is, the two-dimensional codes can represent various data.

SUMMARY OF THE INVENTION

An object of the present invention is to provide a print medium on which a great amount of electronic data can be recorded in addition to human-readable data.

Another object of the present invention is to provide a print information processing system being capable of producing a print medium on which a great amount of electronic data are recorded in addition to human-readable data, reading the electronic data printed on the print medium, and reproducing original data represented by the electronic data.

A further object of the present invention is to provide a print information processing system being capable of producing a print medium on which electronic data are recorded in addition to human-readable data, reading the electronic data printed on the print medium, and reproducing original data represented by the electronic data.

(1) According to the first aspect of the present invention, there is provided a print information processing system comprising a print data recording apparatus and a print data reproducing apparatus. The print data recording apparatus includes a human-readable image generation unit which generates a human-readable image representing first data, a two-dimensional code image generation unit which generates a two-dimensional code image representing second data, a print data generation unit which combines the human-readable image and the two-dimensional code image to generate print data, and a printing unit which prints the print data on a print medium. The print data reproducing apparatus includes a reading unit which reads the two-dimensional code image included in the print data printed on the print medium, and a print data decoding unit which decodes the two-dimensional code image read by the reading unit, to reproduce the second data.

The print medium according to the first aspect of the present invention enables a user (reader of the human-readable data) to easily refer to additional information which is related to the human-readable data and included in the two-dimensional code information.

The print data recording system according to the first aspect of the present invention, the print data recording apparatus records (prints) on a print medium electronic data in the form of a two-dimensional code, in addition to human-readable data. The electronic data recorded on the print medium can be read by the print data reproducing apparatus to reproduce original data. Therefore, electronic data representing sound, moving pictures, computer programs, and the like, which cannot be recorded in a human-readable form on the print medium, can be distributed to readers of printed matters in the form of a two-dimensional code which is printed together with human-readable data. Thus, a reader of the print medium can use or refer to electronic data representing sound, moving pictures, computer programs, and the like, which cannot be recorded in a human-readable form on the print medium.

The print data recording system according to the first aspect of the present invention may have one or any possible combination of the following additional features.

(i) The print data generation unit may superimpose the human-readable image and the two-dimensional code image to generate the print data.

(ii) The print data generation unit may superimpose the human-readable image on the two-dimensional code image to generate the print data, and different colors may be assigned to the human-readable image and the two-dimensional code image.

(iii) In the above feature (ii), a first and second colors may be assigned to the human-readable image and the two-dimensional code image, respectively, where the first color may be similar to a third color of light with which the print medium is illuminated when the reading unit reads the two-dimensional code image.

(iv) The print data generation unit may generate the print data by overwriting a portion of the human-readable image with the two-dimensional code image.

(v) In the feature (iv), the two-dimensional code image may represent at least a portion of the first data represented by the portion of the human-readable image which is overwritten with the two-dimensional code image.

(vi) The print data recording apparatus may further comprise a data division unit which divides third data into first and second portions, supplies as the first data the first portion of the third data to the human-readable image generation unit, and supplies as the second data the second portion of the third data to the two-dimensional code image generation unit.

(vii) In the feature (vi), the data division unit may determine the first and second portions of the third data by dividing the third data into N subportions, choosing M subportions from among the N subportions as constituents of the first portion of the third data, and choosing (N–M) subportions from among the N subportions as constituents of the second portion of the third data, where $N \geq 2$, $1 \leq M \leq N-1$, and the M subportions and the (N–M) subportions do not overlap.

(viii) The two-dimensional code image generation unit may comprise a plurality of color-component two-dimensional code image generation units which generate a plurality of two-dimensional code images to which a plurality of separable color components are assigned, respectively, where the plurality of two-dimensional code images represent a plurality of data items, respectively.

(ix) In the feature (viii), the two-dimensional code image generation unit may comprise a data division unit which divides the second data into the plurality of data items.

(x) In the feature (viii), the print data recording apparatus may further comprise an identification image generation unit which generates a plurality of identification images respectively provided for identifying the plurality of two-dimensional code images, and the print data generation unit may generate the print data by superimposing the plurality of two-dimensional code images to produce a superimposed image, and synthesizing the superimposed image and the plurality of identification images.

(xi) In the feature (x), the print data generation unit may rotate each of the plurality of two-dimensional code images so that the said each of the plurality of two-dimensional code images is oriented in a direction in which the reading unit reads the said each of the plurality of two-dimensional code images, before superimposing the plurality of two-dimensional code images, and synthesize the superimposed image and the plurality of identification images so that one of the plurality of identification images corresponding to each of the plurality of two-dimensional code images is arranged on an upstream side of the said each of the plurality of two-dimensional code images in the direction.

(xii) The second data may include a plurality of data items, the print data recording apparatus may further comprise an identification image generation unit which generates a plurality of identification images provided for use in selecting one of the plurality of data items as a data item to be decoded from the two-dimensional code image by the print data decoding unit, and the print data generation unit may encode the plurality of data items to produce a monochrome two-dimensional code image as the two-dimensional code image, and synthesize the monochrome two-dimensional code image and the plurality of identification images to generate the print data.

(xiii) In the feature (i), the print data recording apparatus may further comprise a dummy two-dimensional code image generation unit which generates a dummy two-dimensional code image which is independent of the second data, and to which a first color is assigned, where the first color is similar to a second color of light with which the print medium is illuminated when the reading unit reads the two-dimensional code image.

(xiv) In the feature (i), the print data recording apparatus may further comprise a decodability determining unit which makes an attempt to decode the two-dimensional code image before supplying the print data to the printing unit, makes the human-readable image generation unit generate another human-readable image having a reduced size when the attempt fails, and determines that the print data can be supplied to the printing unit, when the attempt succeeds.

(2) According to the second aspect of the present invention, there is provided a print data recording apparatus comprises a human-readable image generation unit which generates a human-readable image representing first data; a two-dimensional code image generation unit which generates a two-dimensional code image representing second data; a print data generation unit which combines the human-readable image and the two-dimensional code image to generate print data; and a printing unit which prints the print data on a print medium.

By using the print data recording apparatus according to the second aspect of the present invention, electronic data representing sound, moving pictures, computer programs, and the like, which cannot be recorded in a human-readable form on a print medium, can be printed on the print medium in the form of a two-dimensional code, in addition to human-readable data.

The print information processing apparatus according to the second aspect of the present invention may also have one or any possible combination of the aforementioned additional features (i) to (xiv).

(3) According to the third aspect of the present invention, there is provided a product for use with a print information recording apparatus. The product, when used with the print information recording apparatus, is able to output control information which directs the print information recording apparatus to realize the functions of the print information recording apparatus according to the second aspect of the present invention.

The product according to the third aspect of the present invention may have one or any possible combination of the aforementioned additional features from (i) to (xiv).

(4) According to the fourth aspect of the present invention, there is provided a print medium on which a human-readable image representing first data and a two-dimensional code image representing second data are printed.

The print medium according to the fourth aspect of the present invention may have one or any possible combination of the following additional features.

(xv) The human-readable image and the two-dimensional code image may be superimposed.

(xvi) In addition to the feature (xv), the human-readable image and the two-dimensional code image may be respectively printed in first and second colors which are different.

(xvii) In addition to the feature (xvi), the first color may be complementary to the second color.

(xviii) A portion of the human-readable image may be overwritten with the two-dimensional code image.

(xix) In addition to the feature (xviii), the two-dimensional code image may represent at least a portion of the first data represented by the portion of the human-readable image which is overwritten with the two-dimensional code image.

(xx) The two-dimensional code image may include a plurality of color-component two-dimensional code images to which a plurality of separable color components are assigned, respectively, where the plurality of two-dimensional code images respectively represent a plurality of data items.

(xxi) In addition to the feature (xx), the plurality of two-dimensional code images may be superimposed to form a superimposed image, and the superimposed image and a plurality of identification images may be synthesized, where the plurality of identification images are provided for identifying the plurality of two-dimensional code images, respectively.

(xxii) In addition to the feature (xxi), each of the plurality of two-dimensional code images may be oriented in a direction in which the said each of the plurality of two-dimensional code images is to be read, and one of the plurality of identification images corresponding to each of the plurality of two-dimensional code images may be arranged on an upstream side of the said each of the plurality of two-dimensional code images in the direction.

(xxiii) The second data may include a plurality of data items, the two-dimensional code image may be a monochrome two-dimensional code image representing the plurality of data items, the monochrome two-dimensional code image and a plurality of identification images may be synthesized, where the plurality of identification images provided for use in selecting one of the plurality of data items as a data item to be decoded from the two-dimensional code image.

(xxiv) In addition to the feature (xx), the two-dimensional code image may be superimposed on a dummy two-dimensional code image which is independent of the second data, and to which a first color is assigned, where the first color may be similar to a second color of light with which the print medium is to be illuminated when the two-dimensional code image is read.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIGS. 19(A) to 19(J) are diagrams provided for explaining relationships between the main scanning directions of the images generated in the sixth or seventh embodiment, moving (sweeping) directions of a handheld scanner, and images obtained by the scanning;

DESCRIPTION OF THE PREFERRED EMBODIMENTS

Embodiments of the present invention are explained in detail below with reference to drawings.

(1) Functions of Print Information Processing System

Figure 1:
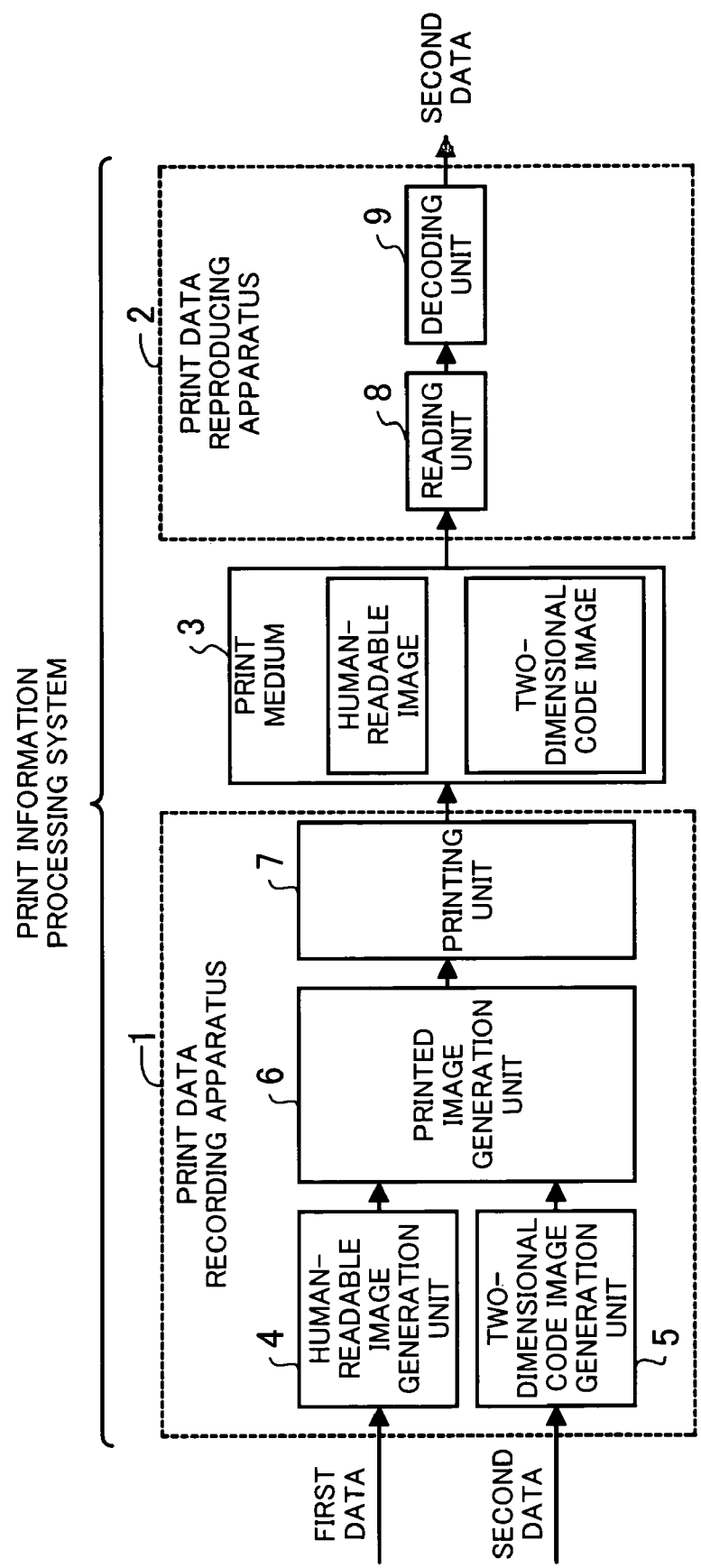
FIG. 1 is a diagram illustrating basic functions of the print information processing system according to the present invention.

FIG. 1 is a diagram illustrating basic functions of the print information processing system according to the present invention. The print information processing system of FIG. 1 includes a print data recording apparatus 1 and a print data reproducing apparatus 2. The print data recording apparatus 1 prints human-readable data and a two-dimensional code on a print medium 3, and the print data reproducing apparatus 2 reads and decodes the two-dimensional code printed on the print medium 3. The print medium 3 is a printable medium having the form of a sheet or card. For example, the print medium 3 is a sheet of paper.

The print data recording apparatus 1 in the print data recording apparatus 1 comprises a human-readable image generation unit 4, a two-dimensional code image generation unit 5, a pronted image generation unit 6, and a printing unit 7. The human-readable image generation unit 4 inputs first data for use in producing a human-readable image, and outputs printable image data of the human-readable image. The human-readable image is an image which is visually recognizable, such as characters, photographs, and figures. When the first data input into the human-readable image generation unit 4 are not in the form of printable image data, the human-readable image generation unit 4 transforms the first data into the printable image data of the human-readable image.

The two-dimensional code image generation unit 5 inputs second data for use in producing a two-dimensional code image, and outputs printable image data of the two-dimensional code image. When the second data input into the two-dimensional code image generation unit 5 is different from the printable image data output from the two-dimensional code image generation unit 5, the two-dimensional code image generation unit 5 transforms the first data into the printable image data of the two-dimensional code image.

The printed image generation unit 6 receives and combines the printable image data output from the human-readable image generation unit 4 and the two-dimensional code image generation unit 5 to produce data of a final image to be printed on the print medium 3. The combination is made so that the human-readable image and the two-dimensional code image overlap or do not overlap. The printing unit 7 prints the final image on the print medium 3.

The reading unit 8 in the print data reproducing apparatus 2 reads the two-dimensional code image printed on the print medium 3. For example, a scanner, digital still camera, or the like may be used as the reading unit 8. The decoding unit 9 decodes the two-dimensional code to reproduce the second data which are input into the two-dimensional code image generation unit 5 in the print data recording apparatus 1.

As described above, in the print data recording apparatus 1 of FIG. 1, the human-readable image and the two-dimensional code image can be printed together on a print medium. Thus, it is possible to accompany the human-readable image with the two-dimensional code image relating to the human-readable image. The data represented by the two-dimensional code may be any digital data including computer programs, moving pictures, sound, and other human-readable data such as characters.

(2) Multimedia Newspaper

Figure 2:
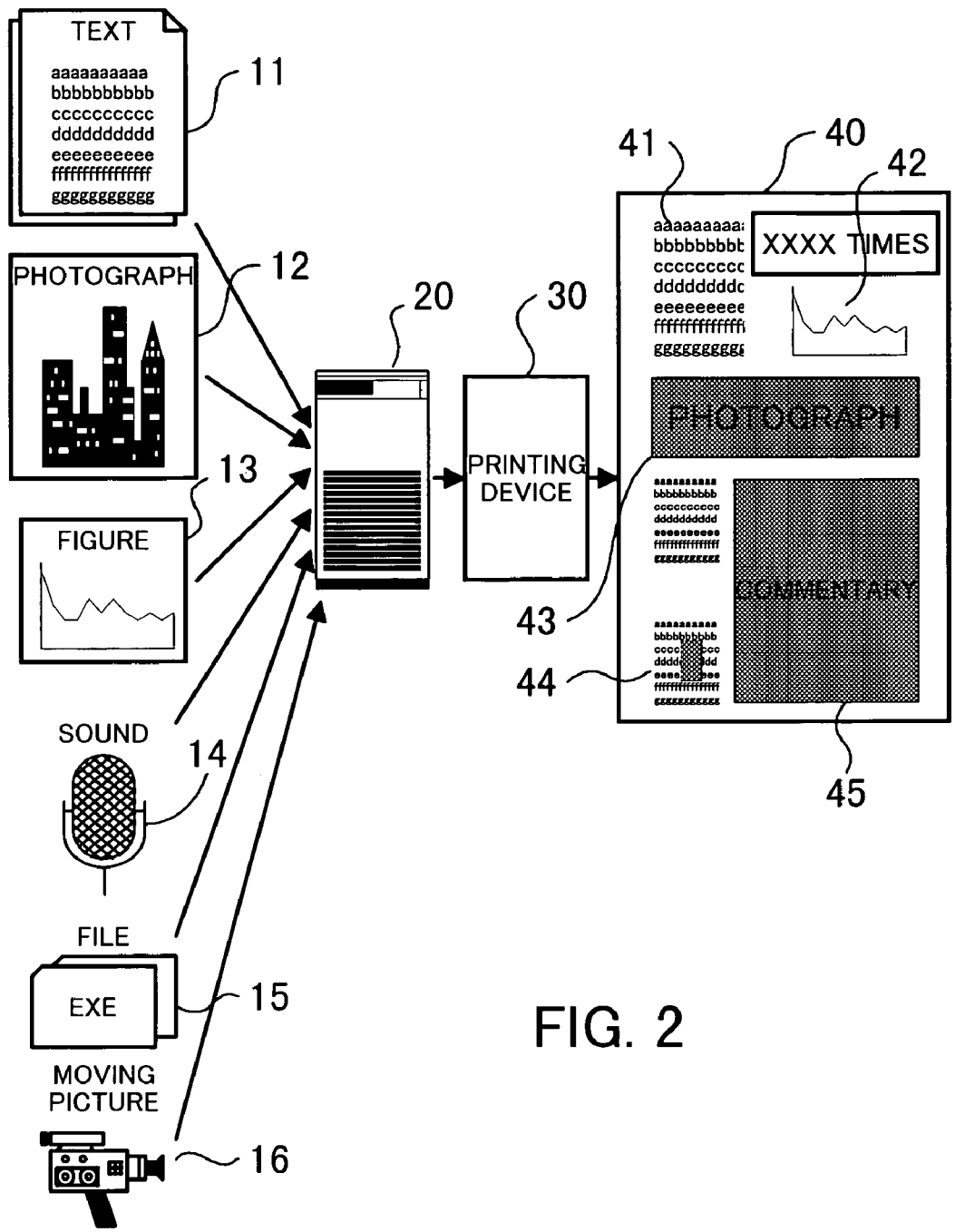
FIG. 2 is a diagram illustrating a concept of the multimedia newspaper system as an example to which the present invention is applied.

FIG. 2 is a diagram illustrating a concept of the multimedia newspaper system as an example to which the present invention is applied. In FIG. 2, data of texts 11, photographs 12, FIG. 13, sound information 14, data files 15, moving pictures 16 are illustrated as input data, where the data files 15 may include computer programs, data of databases, and the like. The input data are input into the computer 20, which generates image data of an image to be printed, based on the input data. Then, the image data are supplied to the printing device 30, which prints the image on a sheet of paper to produce a multimedia newspaper 40. The multimedia newspaper 40 contains human-readable texts 41, human-readable FIG. 42, a superimposed image 43 of human-readable data and a two-dimensional code representing a color photograph, a complex article 44, and a superimposed article image 45. The complex article 44 is comprised of a text and a two-dimensional code image, and a portion of the text is hidden by the two-dimensional code image. The superimposed article image 45 is produced by superimposing human-readable data on a two-dimensional code image of sound, programs, moving pictures, sound, and other human-readable data such as characters.

(3) Hardware Construction of Print Data Recording Apparatus

Figure 3:
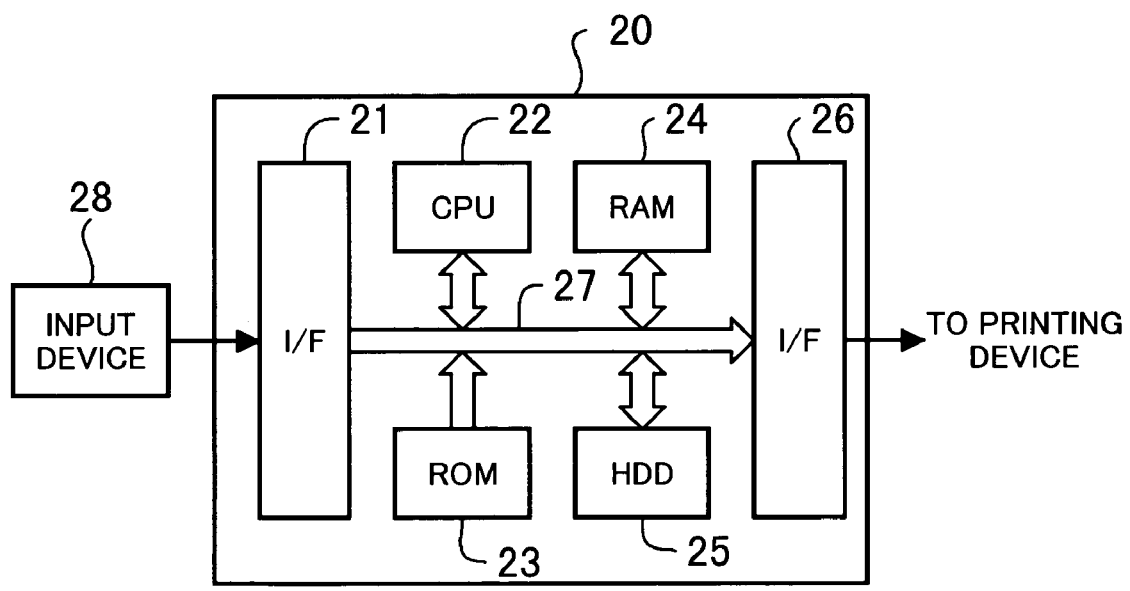
FIG. 3 is a diagram illustrating an exemplary hardware construction of a computer 20 which processes the input data to produce the image data to be printed.

FIG. 3 is a diagram illustrating an exemplary hardware construction of a computer 20 which processes the input data to produce the image data to be printed. The computer 20 comprises an input interface 21, a central processing unit (CPU) 22, a read-only memory (ROM) 23, a random access memories (RAM) 24, an external storage device (e.g., hard disk drive) 25, an output interface 26, and a bus 27.

The input interface 21 is connected to at least one input device 28 which inputs at least one type of input data. The external storage device 25 stores an operating system, a print information processing program, and various data input through the input interface 21. The RAM 24 stores the print information processing program and a portion of the various data which is necessary for generating the image data. The CPU 22 executes the print information processing program based on the various data. The generated image data is output through the output interface 26 to the printing device 30.

(4) Hardware Construction of Print Data Reproducing Apparatus

Figure 4:
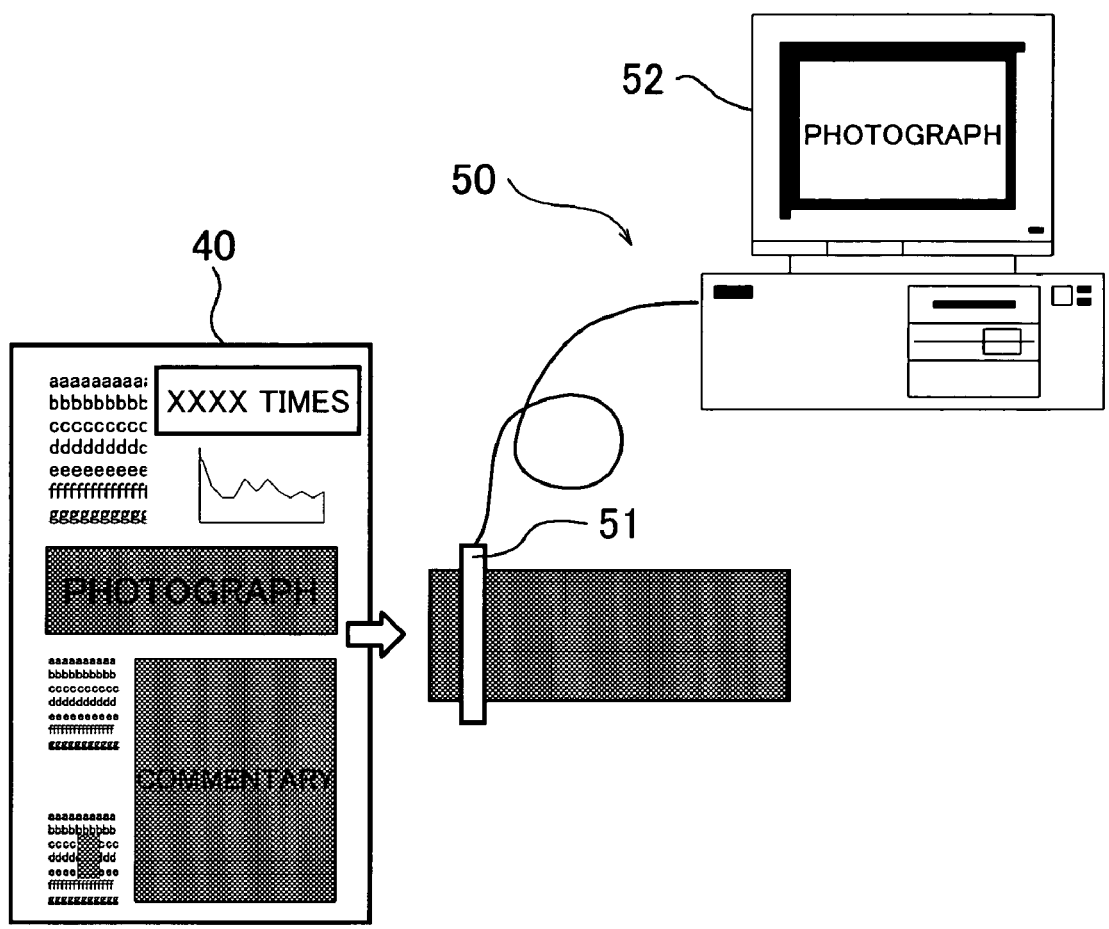
FIG. 4 is a diagram illustrating an exemplary hardware construction 50 of the print data reproducing apparatus 2.

FIG. 4 is a diagram illustrating an exemplary hardware construction 50 of the print data reproducing apparatus 2. The print data reproducing apparatus 50 of FIG. 4 is comprised of a handheld scanner 51 and a personal computer 52. Although not shown, the personal computer 52 contains an interface connected to the handheld scanner 51, and software for reproducing original data from a two-dimensional code image read by the handheld scanner 51.

When the printed image of the multimedia newspaper 40 is read by the handheld scanner 51, the image data is processed by the personal computer 52 to decode the two-dimensional code to reproduce the original data as necessary. For example, when the decoded data include a photograph, the photograph can be reproduced on a display screen of the personal computer 52 by an appropriate image display program.

(5) First Embodiment

Operations and constructions of various embodiments of the present invention are explained below.

Figure 5:
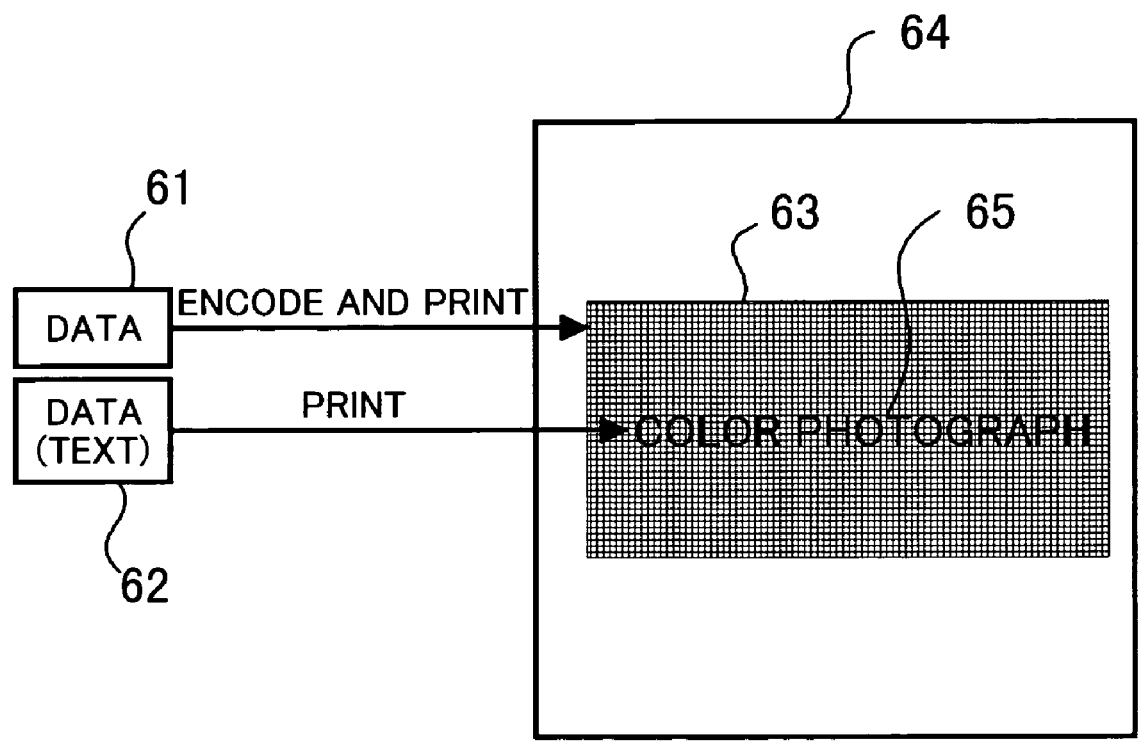
FIG. 5 is a diagram illustrating the operation of printing a human-readable image and a two-dimensional code image together on a print medium in the first embodiment.

FIG. 5 is a diagram illustrating the operation of printing a human-readable image and a two-dimensional code image together on a print medium in the first embodiment. In the first embodiment, a two-dimensional code image 63 and a human-readable image 65 are superimposed on a sheet of paper 64, as illustrated in FIG. 5. For example, first, the two-dimensional code image 63 is printed on the sheet of paper 64, and then the human-readable image 65 is printed so that the human-readable image 65 is superimposed on the two-dimensional code image 63. Due to the superposition, an amount of information which can be printed in the same area is increased.

The two-dimensional code image 63 is generated by encoding any type of digital data 61, e.g., data representing characters, photographs, figures, sound, images, computer programs, or the like. The two-dimensional code image 63 may be a two-dimensional code, which is comprised of two-dimensionally arrayed dots generated by conversion of the digital data 61. For example, the two-dimensional code may be a SmartCode. ("SmartCode" is a trademark of Infoimaging Technologies, Inc.) Although the human-readable image 65 may contain characters, photographs, figures, or the like, preferably, the human-readable image 65 represents texts.

In the first embodiment, it is preferable that the two-dimensional code image 63 and the human-readable image 65 are printed in different colors. For example, when a human-readable image 65 of a text is printed in red, and a two-dimensional code image 63 is printed in green and/or blue, and superimposed on the human-readable image 65, the human-readable image 65 and the two-dimensional code image 63 can be separately obtained by reading the superimposed image by a color scanner, and separating the superimposed image into images of RGB components. Alternatively, when a human-readable image 65 of a text is printed in red, and a two-dimensional code image 63 is printed in black, and superimposed on the human-readable image 65, only the two-dimensional code image 63 can be read by scanning the superimposed image with red light. Since the human-readable image 65 has the same color as the scanning light, the human-readable image 65 is not read by the scanning, and therefore only the two-dimensional code image 63 can be selectively read.

Figure 6:
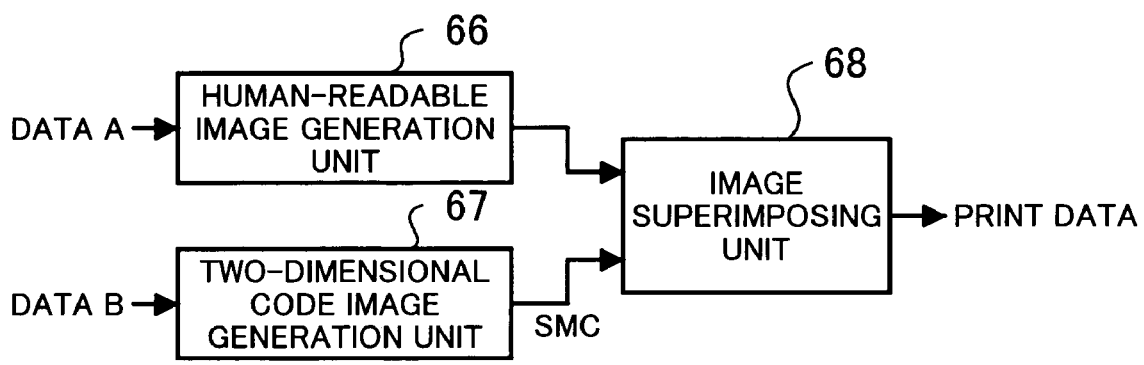
FIG. 6 is a diagram illustrating an example of the construction of a print information processing unit which generates data of an image to be printed on a print medium in the first embodiment.

FIG. 6 is a diagram illustrating an example of the construction of a print information processing unit which generates data of an image to be printed on a print medium in the first embodiment. The print information processing unit of FIG. 6 comprises a human-readable image generation unit 66, a two-dimensional code image generation unit 67, and an image superimposing unit 68. The human-readable image generation unit 66 inputs data A representing documents, photographs, figures, or the like, and transforms the data A into image data of a human-readable image. The two-dimensional code image generation unit 67 inputs data B which is to be represented in the form of a two-dimensional code, and encodes the data B to produce a two-dimensional code image (e.g., an image of a SmartCode) representing the data B. The image superimposing unit 68 generates image data of a superimposed image of the human-readable image generated by the human-readable image generation unit 66 and the two-dimensional code image generated by the two-dimensional code image generation unit 67. For example, the image superimposing unit 68 uses only the red component of the human-readable image generated by the human-readable image generation unit 66 and green and blue components of the two-dimensional code image generated by the two-dimensional code image generation unit 67 for generation of the image data of the superimposed image. When the image data generated by the image superimposing unit 68 is supplied to a printing device, the superimposed image can be printed as illustrated in FIG. 5.

(6) Second Embodiment

Figure 7:
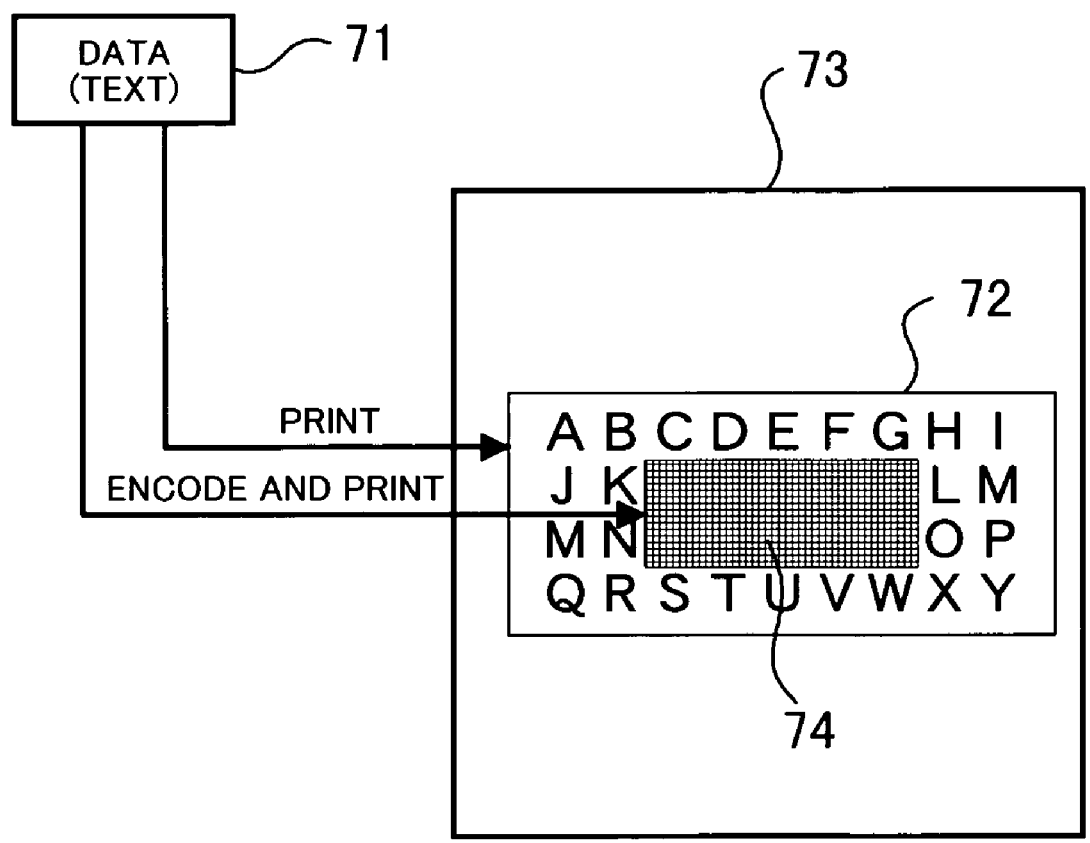
FIG. 7 is a diagram illustrating the operation of printing a human-readable image and a two-dimensional code image together on a print medium in the second embodiment.

FIG. 7 is a diagram illustrating the operation of printing a human-readable image and a two-dimensional code image together on a print medium in the second embodiment. In the second embodiment, a two-dimensional code image 74 and a human-readable image 72 are printed on a sheet of paper 73, so that a portion of the human-readable image 72 is hidden by the two-dimensional code image 74, and information represented by the hidden portion of the human-readable image 72 is included in (i.e., represented by) the two-dimensional code image 74. Therefore, in the second embodiment, when a human-readable image 72 is requested to be printed on a print medium, and a portion of the human-readable image 72 is requested to be hidden on the print medium, the portion of the human-readable image 72 which is requested to be hidden, can be hidden by the two-dimensional code image 74 on the print medium, and thereafter can be restored by decoding the two-dimensional code image 74. The two-dimensional code image 74 may include the entire information represented by the human-readable image 72, or only the above portion of the human-readable image 72 which is requested to be hidden.

Figure 8:
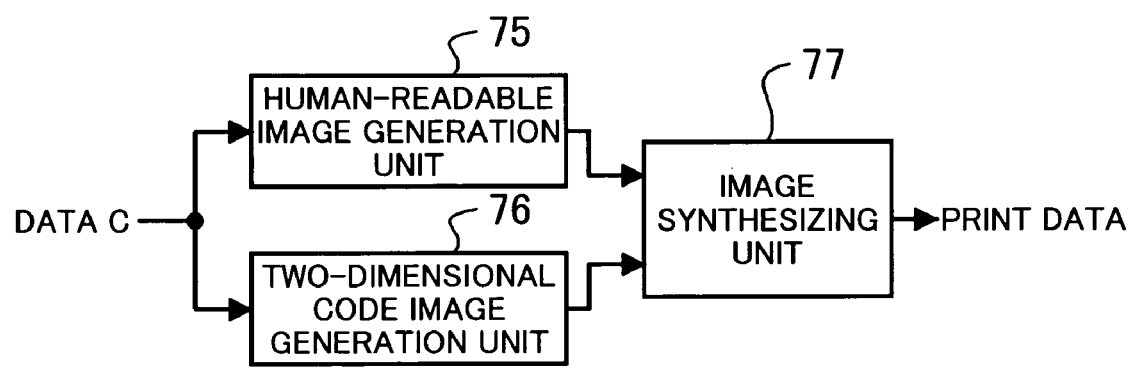
FIG. 8 is a diagram illustrating an example of the construction of a print information processing unit which generates data of an image to be printed on a print medium in the second embodiment.

FIG. 8 is a diagram illustrating an example of the construction of a print information processing unit which generates data of an image to be printed on a print medium in the second embodiment. In particular, the example of FIG. 8 is provided for generating image data including a human-readable image and a two-dimensional code image which are generates based on identical input data.

The print information processing unit of FIG. 8 comprises a human-readable image generation unit 75, a two-dimensional code image generation unit 76, and an image synthesizing unit 77. The human-readable image generation unit 75 inputs data C representing documents, photographs, figures, or the like, and transforms the data C into image data of a human-readable image. The two-dimensional code image generation unit 76 inputs the same data C, and encodes the data C to produce a two-dimensional code image (e.g., an image of a SmartCode) representing the data C. The image synthesizing unit 77 synthesizes the human-readable image generated by the human-readable image generation unit 75 and the two-dimensional code image generated by the two-dimensional code image generation unit 76. For example, the synthesizing operation is performed such that a center portion of the human-readable image generated by the human-readable image generation unit 75 is cut off, and the two-dimensional code image generated by the two-dimensional code image generation unit 76 is inserted into the cutout portion of the human-readable image. Thus, when the image data generated by the image synthesizing unit 77 is supplied to a printing device, the two-dimensional code image 74 and the human-readable image 72 are printed on the sheet of paper 73, so that a portion of the human-readable image 72 is hidden by the two-dimensional code image 74 as illustrated in FIG. 7.

(7) Third Embodiment

Figure 9:
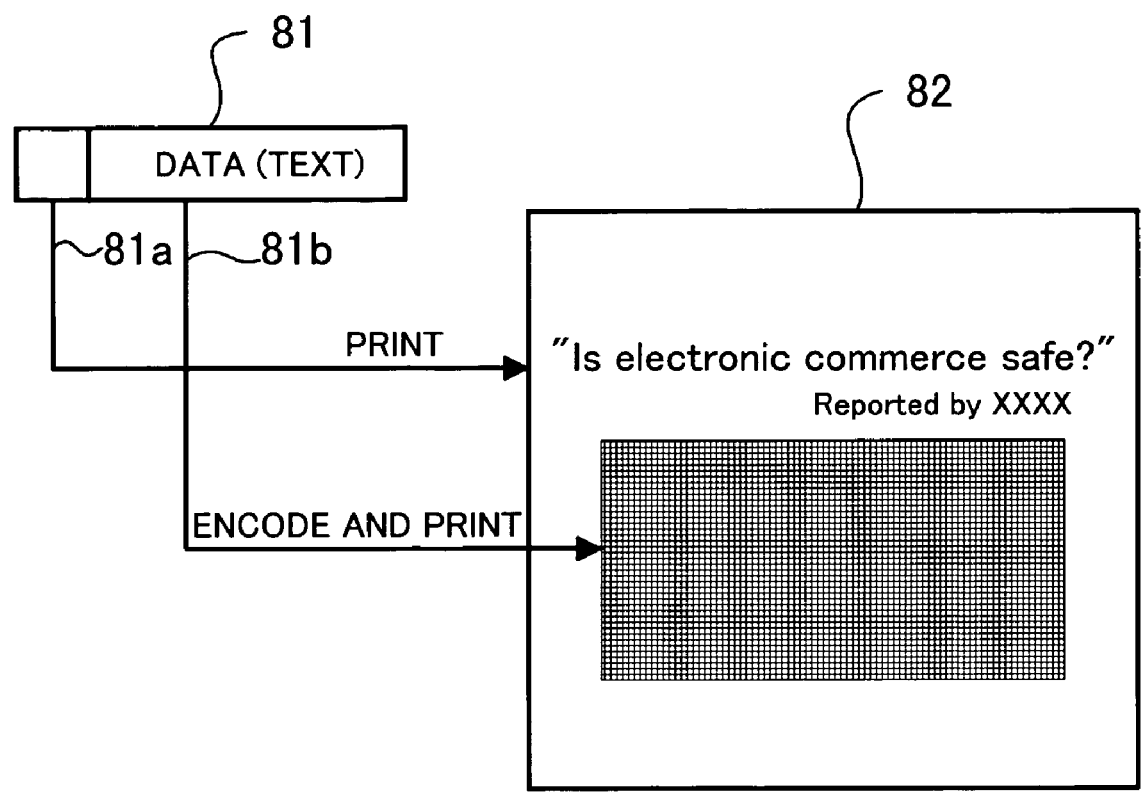
FIG. 9 is a diagram illustrating the operation of printing a human-readable image and a two-dimensional code image together on a print medium in the third embodiment.

FIG. 9 is a diagram illustrating the operation of printing a human-readable image and a two-dimensional code image together on a print medium in the third embodiment. In the third embodiment, input data 81 are divided into first and second portions 81*a* and 81*b*, the first portion 81*a* of the input data 81 is transformed into a human-readable image, and the second portion 81*b* of the input data 81 is transformed into a two-dimensional code image. Both of the two-dimensional code image and the human-readable image are supplied to a printing device so that both of the two-dimensional code image and the human-readable image are printed in different areas on a sheet of paper 82, as illustrated in FIG. 9. For example, newspaper articles are usually comprised of headlines and/or abstracts and texts (bodies of the newspaper articles). When only the headlines and/or abstracts are printed in the form of a human-readable image, and the texts are printed in the form of a two-dimensional code image, a great number of articles can be printed on the sheet of paper 82.

Figure 10:
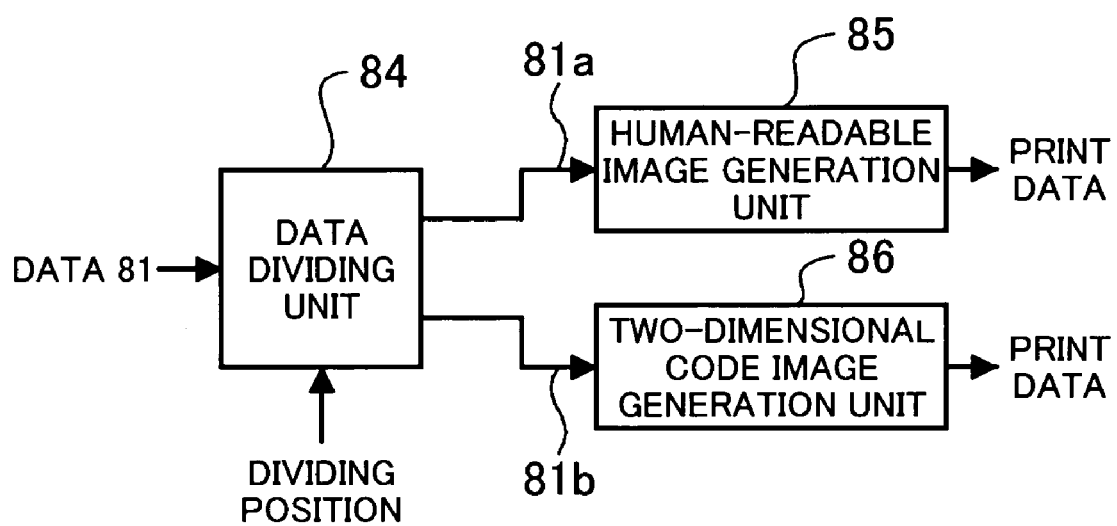
FIG. 10 is a diagram illustrating an example of the construction of a print information processing unit which generates data of an image to be printed on a print medium in the third embodiment.

FIG. 10 is a diagram illustrating an example of the construction of a print information processing unit which generates data of an image to be printed on a print medium in the third embodiment. The print information processing unit of FIG. 10 comprises a data dividing unit 84, a human-readable image generation unit 85, and a two-dimensional code image generation unit 86. The data dividing unit 84 receives control information indicating a dividing position, and input data 81 representing documents, photographs, figures, or the like. Then, the data dividing unit 84 divides the input data 81 at the dividing position indicated by the received control information, into the first and second portions 81*a* and 81*b*. The human-readable image generation unit 85 inputs the first portion 81*a* of the input data 81, and transforms the first portion 81*a* into image data of a human-readable image. The two-dimensional code image generation unit 86 inputs the second portion 81*b* of the input data 81, and encodes the second portion 81*b* to produce a two-dimensional code image (e.g., an image of a Smart-Code) representing the second portion 81*b*. The human-readable image generated by the human-readable image generation unit 85 and the two-dimensional code image generated by the two-dimensional code image generation unit 86 are output as image data to be printed on the sheet of paper 82. Thus, the human-readable image and the two-dimensional code image are printed on the sheet of paper 82 as illustrated in FIG. 9.

(8) Fourth Embodiment

Figure 11:
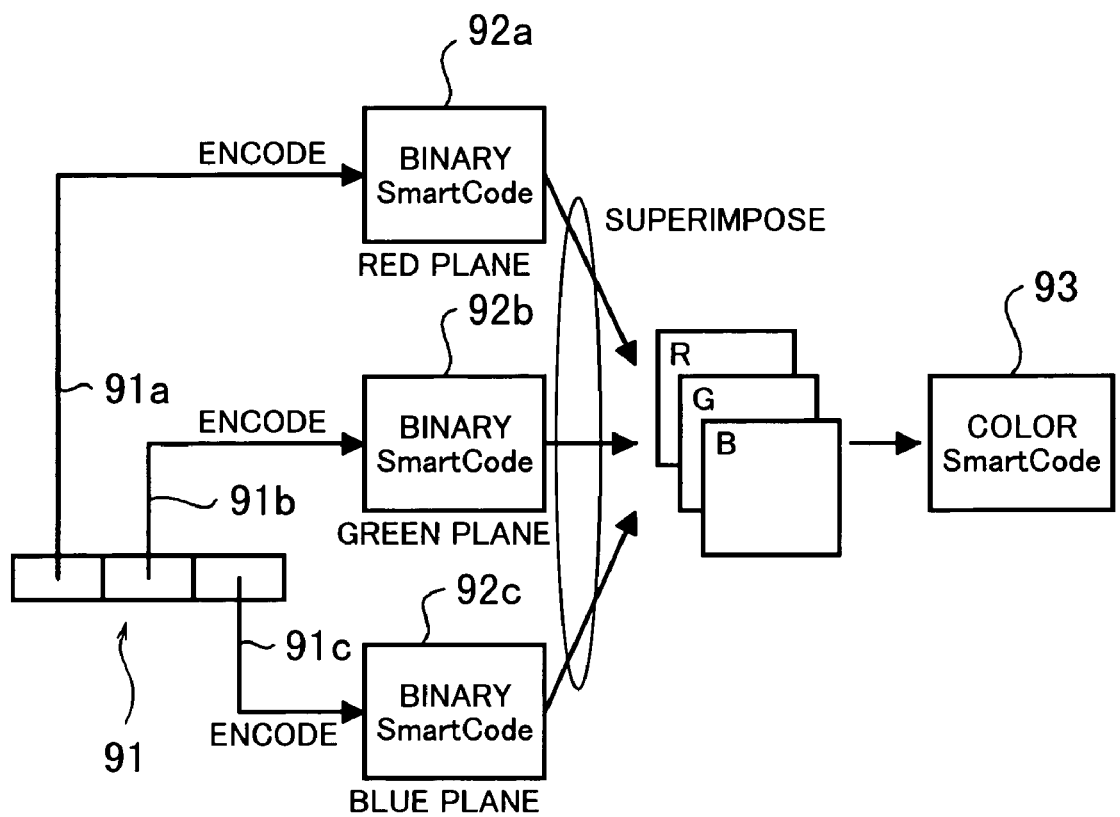
FIG. 11 is a diagram illustrating the operation of printing a human-readable image and a two-dimensional code image together on a print medium in the fourth embodiment.

FIG. 11 is a diagram illustrating the operation of printing a human-readable image and a two-dimensional code image together on a print medium in the fourth embodiment. In the fourth embodiment, input data 91 are divided into a first, second, and third portions 91*a*, 91*b*, and 91*c*. Next, the first, second, and third portions 91*a*, 91*b*, and 91*c* of the input data 91 are respectively encoded to produce a first, second, and third two-dimensional code images. Then, the three primary colors are assigned to the first, second, and third two-dimensional code images, respectively. That is, the first, second, and third two-dimensional code images are defined as two-dimensional code images of the red, green, and blue components on red, green, and blue planes 92*a*, 92*b*, and 92*c*, respectively. When the first, second, and third two-dimensional code images have an identical size, a color two-dimensional code image 93 can be produced by superimposing the two-dimensional code images of the red, green, and blue components, i.e., the first, second, and third two-dimensional code images. For example, when the first, second, and third two-dimensional code images are each represented by a binary SmartCode having an identical size, a color SmartCode can be produced by superimposing the red, green, and blue, binary SmartCodes. The color SmartCode can be printed on a sheet of paper by printing the first, second, and third two-dimensional code images in succession on the sheet of paper so that the first, second, and third two-dimensional code images are superimposed on the sheet of paper. Since the three two-dimensional code images can be printed in the same position, the density of the printed data is three times that of the monochrome two-dimensional code image (e.g., binary SmartCode).

Figure 12:
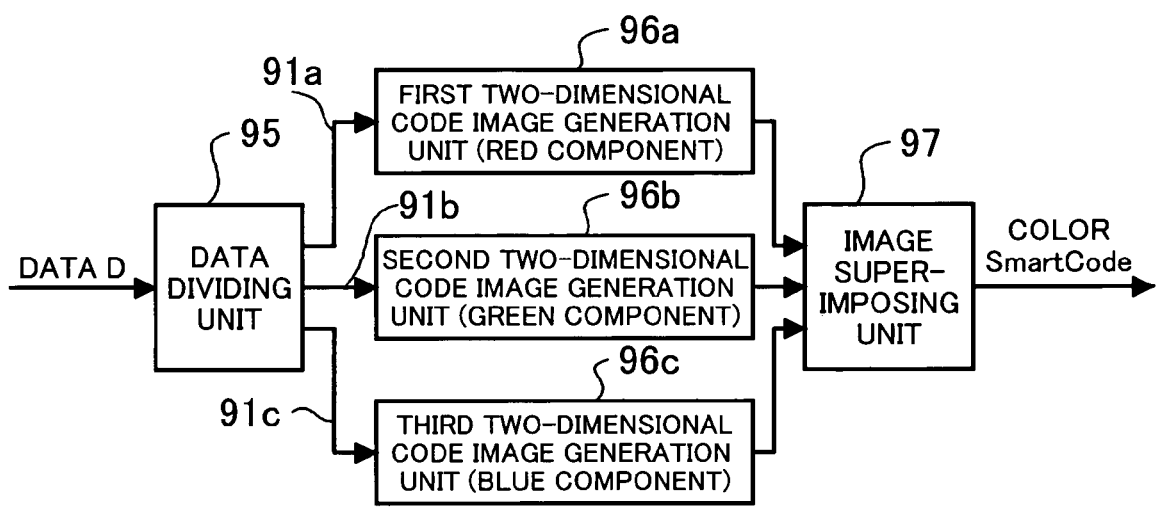
FIG. 12 is a diagram illustrating an example of the construction of a print information processing unit which generates data of an image to be printed on a print medium in the fourth embodiment.

FIG. 12 is a diagram illustrating an example of the construction of a print information processing unit which generates data of an image to be printed on a print medium in the fourth embodiment. The print information processing unit of FIG. 12 comprises a data dividing unit 95, a first two-dimensional code image generation unit 96*a*, a second two-dimensional code image generation unit 96*b*, a third two-dimensional code image generation unit 96*c*, and an image superimposing unit 97. The data dividing unit 95 receives input data D representing documents, photographs, figures, or the like, and divides the input data D into three equal portions, i.e., the first, second, and third portions 91*a*, 91*b*, and 91*c*. The first two-dimensional code image generation unit 96*a* inputs the first portion 91*a* of the input data D, and encodes the first portion 91*a* to produce a first two-dimensional code image (e.g., a first SmartCode) representing the first portion 91*a*. The second two-dimensional code image generation unit 96*b* inputs the second portion 91*b* of the input data D, and encodes the second portion 91*b* to produce a second two-dimensional code image (e.g., a second SmartCode) representing the second portion 91*b*. The third two-dimensional code image generation unit 96*a* inputs the third portion 91*c* of the input data D, and encodes the third portion 91*c* to produce a third two-dimensional code image (e.g., a third SmartCode) representing the third portion 91*c*. The first, second, and third two-dimensional code images are respectively used as images of the red, green, and blue components. The image superimposing unit 97 generates image data of a color two-dimensional code image as a superimposed image of the first, second, and third two-dimensional code images. For example, when the first, second, and third two-dimensional code images are each represented by a binary SmartCode having an identical size, a color SmartCode composed of the red, green, and blue, binary SmartCodes is produced as illustrated in FIG. 11.

In the above construction of FIG. 12, the modes of the division of the input data D and the assignment of the primary color components may be unchanged. For example, the input data D may be equally divided into the front, middle, and rear portions as illustrated in FIG. 11, and the front, middle, and rear portions are assigned to the red, green, and blue components in this order. Alternatively, successive bits of the input data D may be cyclically assigned to the red, green, and blue components from the leading bit of the input data D in units of a predetermined number of bits.

The modes of the division of the input data D and the assignment of the primary color components may be changed for each type of processing. In such a case, it is necessary to attach to the input data D information which indicates the modes of the division of the input data D and the assignment of the primary color components.

(9) Fifth Embodiment

Figure 13:
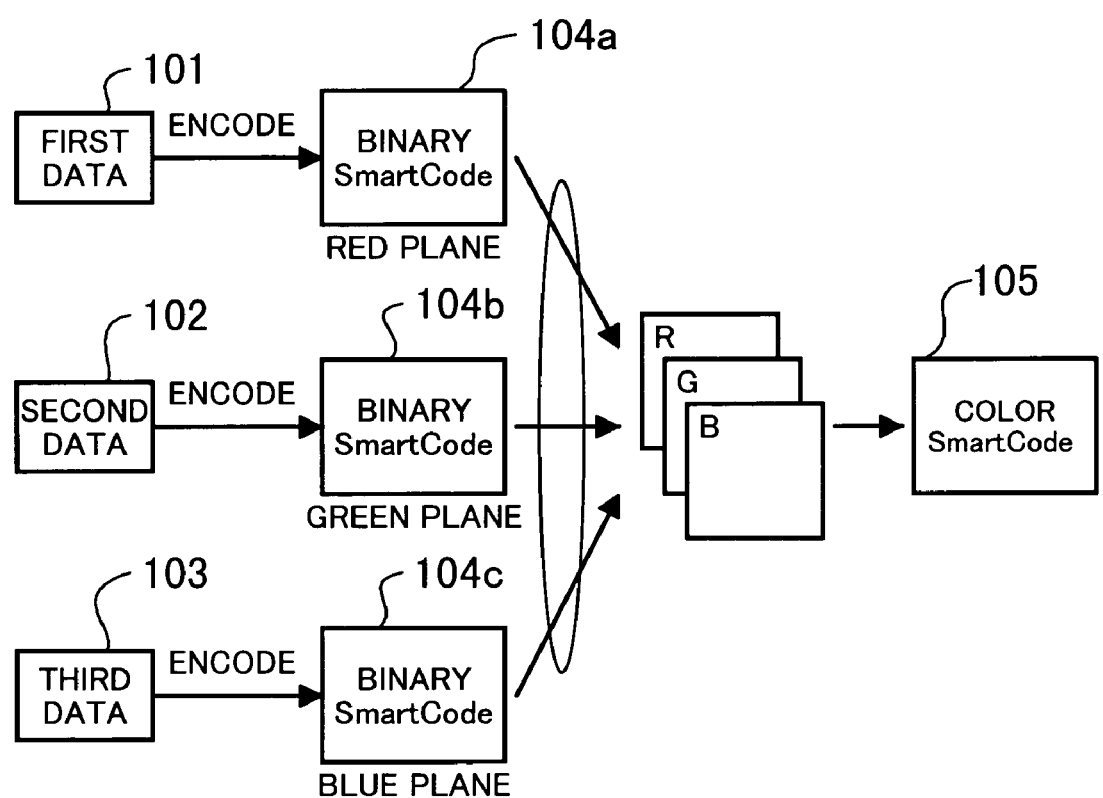
FIG. 13 is a diagram illustrating the operation of printing a human-readable image and a two-dimensional code image together on a print medium in the fifth embodiment.

FIG. 13 is a diagram illustrating the operation of printing a human-readable image and a two-dimensional code image together on a print medium in the fifth embodiment. In the fifth embodiment, a first, second, and third data 101, 102, and 103 are respectively encoded to produce a first, second, and third two-dimensional code images. The first, second, and third two-dimensional code images are defined as two-dimensional code images of the red, green, and blue components on red, green, and blue planes 104*a*, 104*b*, and 104*c*, respectively. When the first, second, and third two-dimensional code images have an identical size, a color two-dimensional code image 105 can be produced by superimposing the two-dimensional code images of the red, green, and blue components, i.e., the first, second, and third two-dimensional code images. For example, when the first, second, and third two-dimensional code images are each represented by a binary SmartCode having an identical size, a color SmartCode can be produced by superimposing the red, green, and blue, binary SmartCodes. The color SmartCode can be printed on a sheet of paper by printing the first, second, and third two-dimensional code images in succession on the sheet of paper so that the first, second, and third two-dimensional code images are superimposed on the sheet of paper. When reading with a color scanner the color two-dimensional code image 105, which represents the three independent data items corresponding to the three primary color components, each of the three independent data items can be selectively reproduced by decoding the corresponding primary color component of the color two-dimensional code image 105.

Figure 14:
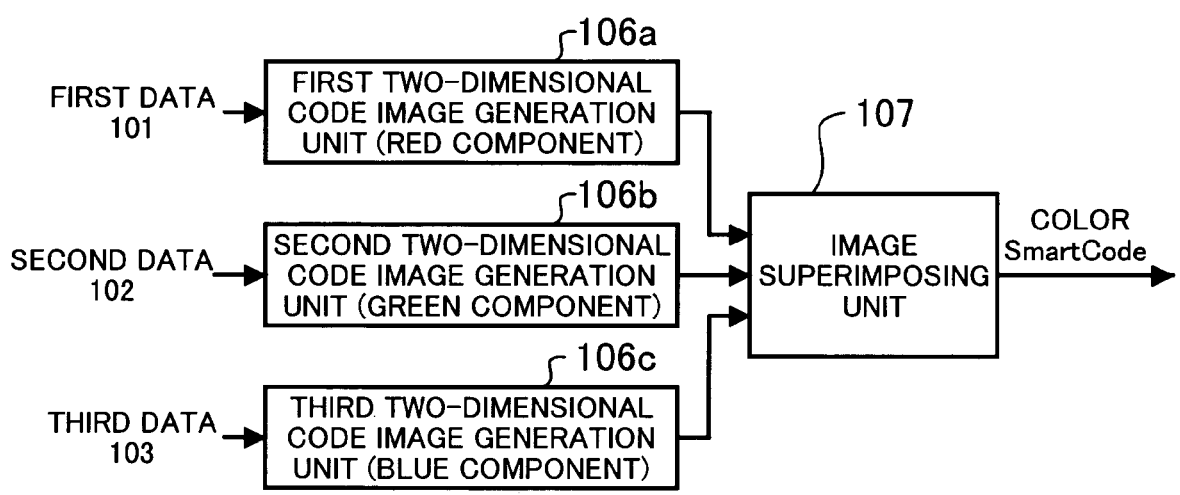
FIG. 14 is a diagram illustrating an example of the construction of a print information processing unit which generates data of an image to be printed on a print medium in the fifth embodiment.

FIG. 14 is a diagram illustrating an example of the construction of a print information processing unit which generates data of an image to be printed on a print medium in the fifth embodiment. The print information processing unit of FIG. 14 comprises a first two-dimensional code image generation unit 106*a*, a second two-dimensional code image generation unit 106*b*, a third two-dimensional code image generation unit 106*c*, and an image superimposing unit 107. The first two-dimensional code image generation unit 106*a* inputs the first data 101, and encodes the first data 101 to produce a first two-dimensional code image (e.g., a first SmartCode) representing the first data 101. The second two-dimensional code image generation unit 106*b* inputs the second data 102, and encodes the second data 102 to produce a second two-dimensional code image (e.g., a second SmartCode) representing the second data 102. The third two-dimensional code image generation unit 106*a* inputs the third data 103, and encodes the third data 103 to produce a third two-dimensional code image (e.g., a third SmartCode) representing the third data 103. The image superimposing unit 107 uses the first, second, and third two-dimensional code images as images of the red, green, and blue components, respectively, and generates image data of a color two-dimensional code image as a superimposed image of the first, second, and third two-dimensional code images. For example, when the first, second, and third two-dimensional code images are each represented by a binary SmartCode having an identical size, a color SmartCode composed of the red, green, and blue, binary SmartCodes is produced as illustrated in FIG. 13.

(10) Sixth Embodiment

Figure 15:
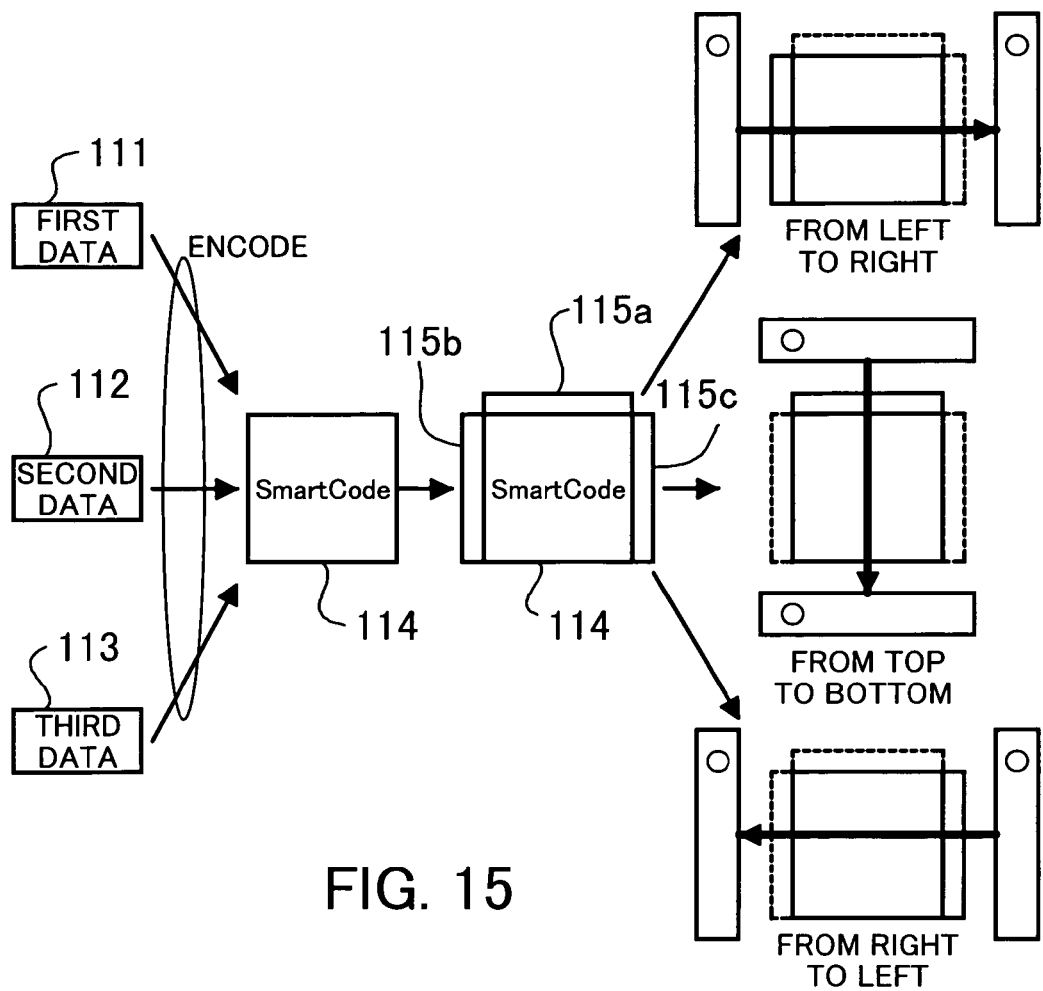
FIG. 15 is a diagram illustrating the operation of printing a human-readable image and a two-dimensional code image together on a print medium in the sixth embodiment.

FIG. 15 is a diagram illustrating the operation of printing a human-readable image and a two-dimensional code image together on a print medium in the sixth embodiment. In the sixth embodiment, a first, second, and third data 111, 112, and 113 are encoded to produce a two-dimensional code image 114, and a first, second, and third identification images 115*a*, 115*b*, and 115*c* are attached to the two-dimensional code image 114. That is, the two-dimensional code image 114 is printed together with the first, second, and third identification images 115*a*, 115*b*, and 115*c*. For example, the two-dimensional code image 114 may be a SmartCode. The first, second, and third identification images 115*a*, 115*b*, and 115*c* are provided so that each of the first, second, and third data 111, 112, and 113 represented by the two-dimensional code image 114 can be selectively reproduced by appropriately choosing the direction of scanning of the two-dimensional code image 114 accompanied by the first, second, and third identification images 115*a*, 115*b*, and 115*c*. For example, the first, second, and third identification images 115*a*, 115*b*, and 115*c* are attached to the left, upper, and right edges of the SmartCode 114, respectively. In this case, when the SmartCode 114 is scanned in the direction from the left to the right, the first identification image 115*a* is first recognized, and therefore the first data 111 is reproduced from among the first, second, and third data 111, 112, and 113 represented by the SmartCode 114. When the SmartCode 114 is scanned in the direction from the top to the bottom, the second identification image 115*b* is first recognized, and therefore the second data 112 is reproduced from among the first, second, and third data 111, 112, and 113 represented by the SmartCode 114. When the SmartCode 114 is scanned in the direction from the right to the left, the third identification image 115*c* is first recognized, and therefore the third data 113 is reproduced from among the first, second, and third data 111, 112, and 113 represented by the SmartCode 114.

Figure 16:
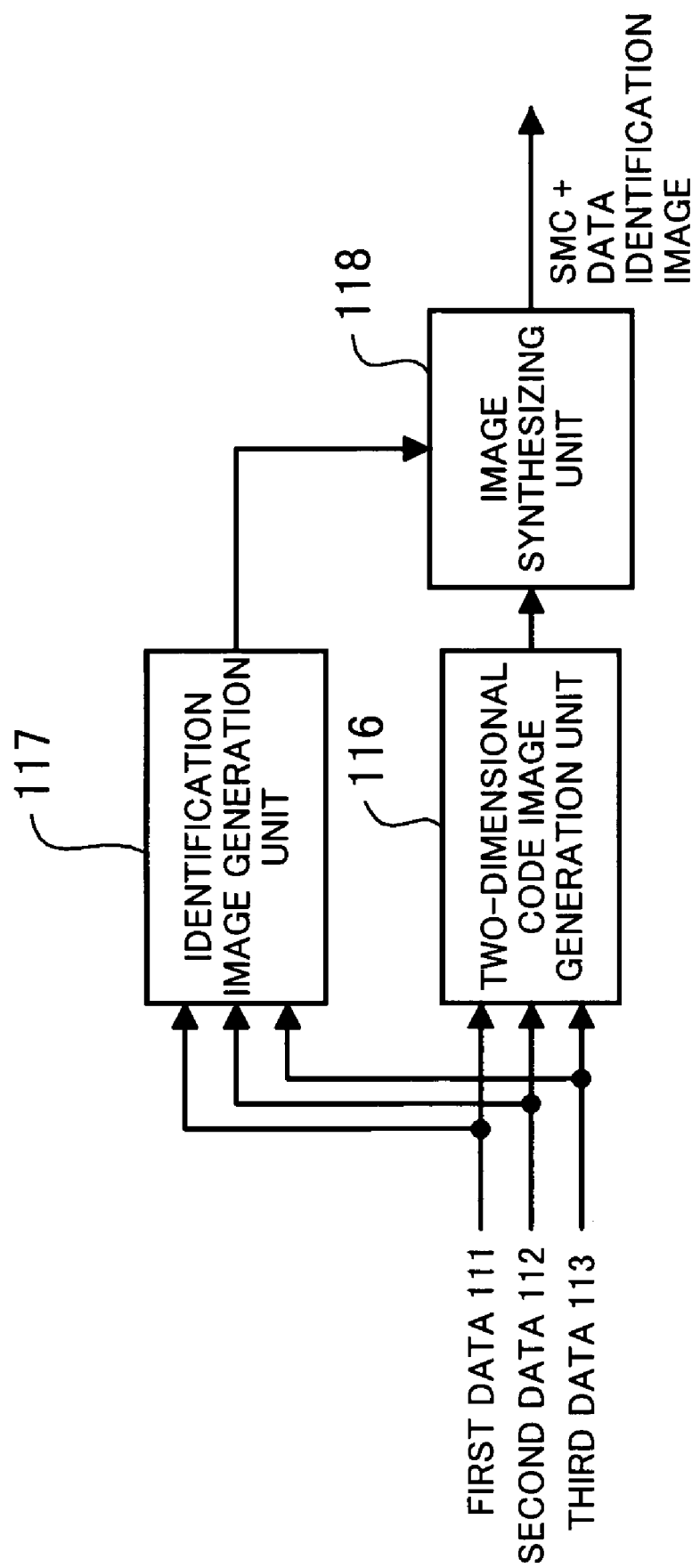
FIG. 16 is a diagram illustrating an example of the construction of a print information processing unit which generates data of an image to be printed on a print medium in the sixth embodiment.

FIG. 16 is a diagram illustrating an example of the construction of a print information processing unit which generates data of an image to be printed on a print medium in the sixth embodiment. The print information processing unit of FIG. 16 comprises a two-dimensional code image generation unit 116, an identification image generation unit 117, and an image synthesizing unit 118. The two-dimensional code image generation unit 116 inputs the first, second, and third data 111, 112, and 113, and encodes them to produce the two-dimensional code image (e.g., a first SmartCode) 114 representing the first, second, and third data 111, 112, and 113. The identification image generation unit 117 generates the first, second, and third identification images 115*a*, 115*b*, and 115*c* as three different patterns, so that each of the first, second, and third data 111, 112, and 113 represented by the two-dimensional code image 114 can be selectively reproduced by appropriately choosing the direction of scanning of the two-dimensional code image 114 which is accompanied by the first, second, and third data 111, 112, and 113. The image synthesizing unit 118 synthesizes the two-dimensional code image 114 generated by the two-dimensional code image generation unit 116 and the first, second, and third identification images 115*a*, 115*b*, and 115*c* generated by the identification image generation unit 117 so that the first, second, and third identification images 115*a*, 115*b*, and 115*c* are attached to the two-dimensional code image 114, for example, as illustrated in FIG. 15. Thus, an integrated image of the two-dimensional code image 114 and the first, second, and third identification images 115*a*, 115*b*, and 115*c* is obtained. The synthesized result is output as the image data to be printed.

(11) Seventh Embodiment

Figure 17:
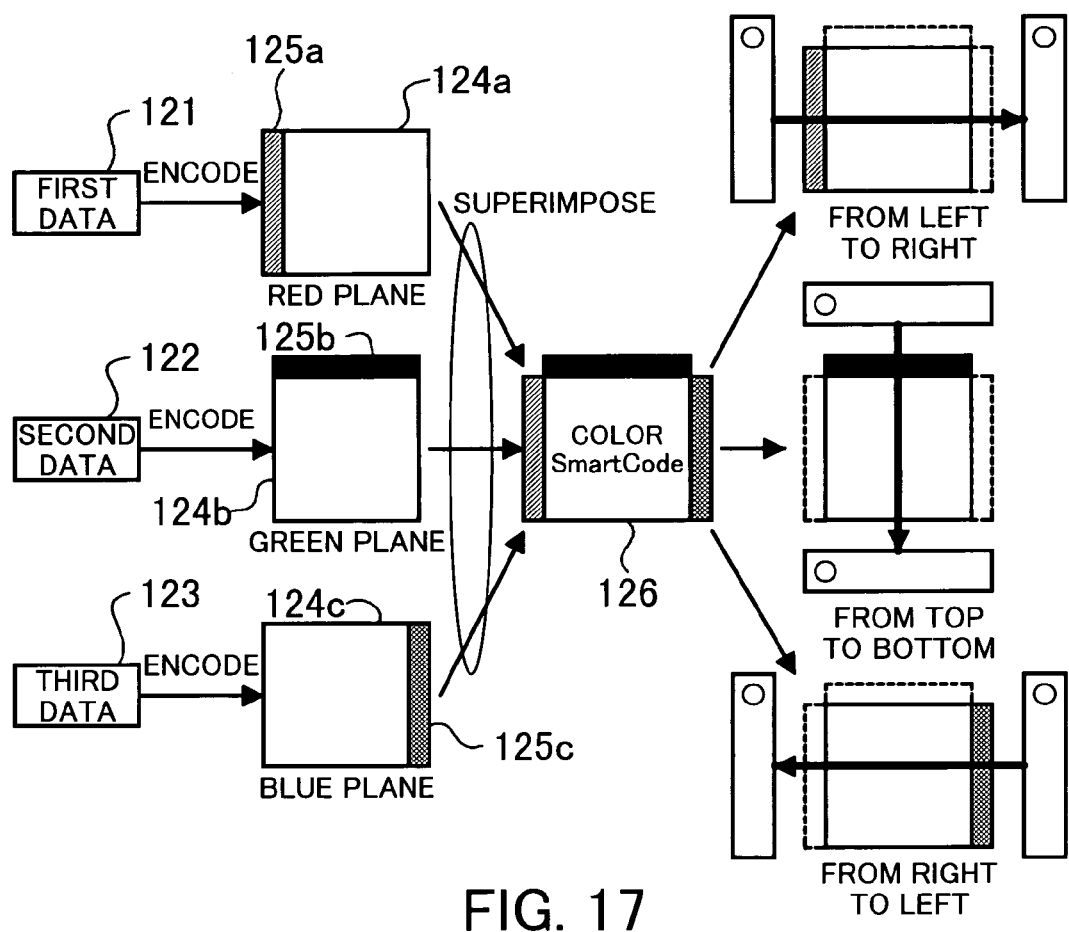
FIG. 17 is a diagram illustrating the operation of printing a human-readable image and a two-dimensional code image together on a print medium in the seventh embodiment.

FIG. 17 is a diagram illustrating the operation of printing a human-readable image and a two-dimensional code image together on a print medium in the seventh embodiment. In the seventh embodiment, a first, second, and third data 121, 122, and 123 are respectively encoded to produce a first, second, and third two-dimensional code images, and a first, second, and third identification images 125*a*, 125*b*, and 125*c* are respectively attached to the first, second, and third two-dimensional code images in different manners. For example, the first identification image 125a is attached to the left edge of the first two-dimensional code image, the second identification image 125b is attached to the upper edge of the second two-dimensional code image, and the third identification image 125c is attached to the right edge of the third two-dimensional code image, as illustrated in FIG. 17. The three primary colors are assigned to the first, second, and third two-dimensional code images, respectively. That is, the first data 121 to which the first identification image 125a is attached is generated on a red plane 124a, the second data 122 to which the second identification image 125b is attached is generated on a green plane 124b, and the third data 123 to which the third identification image 125c is attached is generated on a blue plane 124c. A color two-dimensional code image having identification information is generated by superimposing the first, second, and third data 121, 122, and 123, together with the first, second, and third identification images 125a, 125b, and 125c which are respectively attached to the first, second, and third data 121, 122, and 123. The first, second, and third two-dimensional code images may be SmartCodes respectively provided on the red, green, and blue planes 124a, 124b, and 124c. In this case, the above color two-dimensional code image is a color SmartCode 126 having a red, green, and blue components, as illustrated in FIG. 17.

Alternatively, in the operation of generating the color two-dimensional code image, the first, second, and third two-dimensional code images may be first superimposed without the attachment of the first, second, and third identification images 125a, 125b, and 125c, and thereafter the first, second, and third identification images 125a, 125b, and 125c may be attached to the superimposed image so as to finally produce the above color two-dimensional code image.

The first, second, and third identification images 125a, 125b, and 125c are provided so that each of the first, second, and third data 121, 122, and 123 represented by the two-dimensional code image 124 can be selectively reproduced by appropriately choosing the direction of scanning of the color two-dimensional code image accompanied by the first, second, and third data 121, 122, and 123. In the case wherein the first, second, and third identification images 125a, 125b, and 125c are respectively attached to the left, upper, and right edges of the color SmartCode 126, a portion of the color SmartCode 126 corresponding to a selected one of the first, second, and third data 121, 122, and 123 can be decoded to reproduce the selected data, as follows. That is, when the color SmartCode 126 is scanned in the direction from the left to the right, the first identification image 125a is first recognized, and therefore the red component of the color SmartCode 126 is decoded to reproduce the first data 121. When the color SmartCode 126 is scanned in the direction from the top to the bottom, the second identification image 125b is first recognized, and therefore the green component of the color SmartCode 126 is decoded to reproduce the second data 122. When the color SmartCode 126 is scanned in the direction from the right to the left, the third identification image 125c is first recognized, and therefore the blue component of the color SmartCode 126 is decoded to reproduce the third data 123. That is, the data represented by the two-dimensional code image on each of the red, green, and blue planes 124a, 124b, and 124c can be selectively obtained by appropriately choosing the direction of the scanning of the color SmartCode 126.

Figure 18:
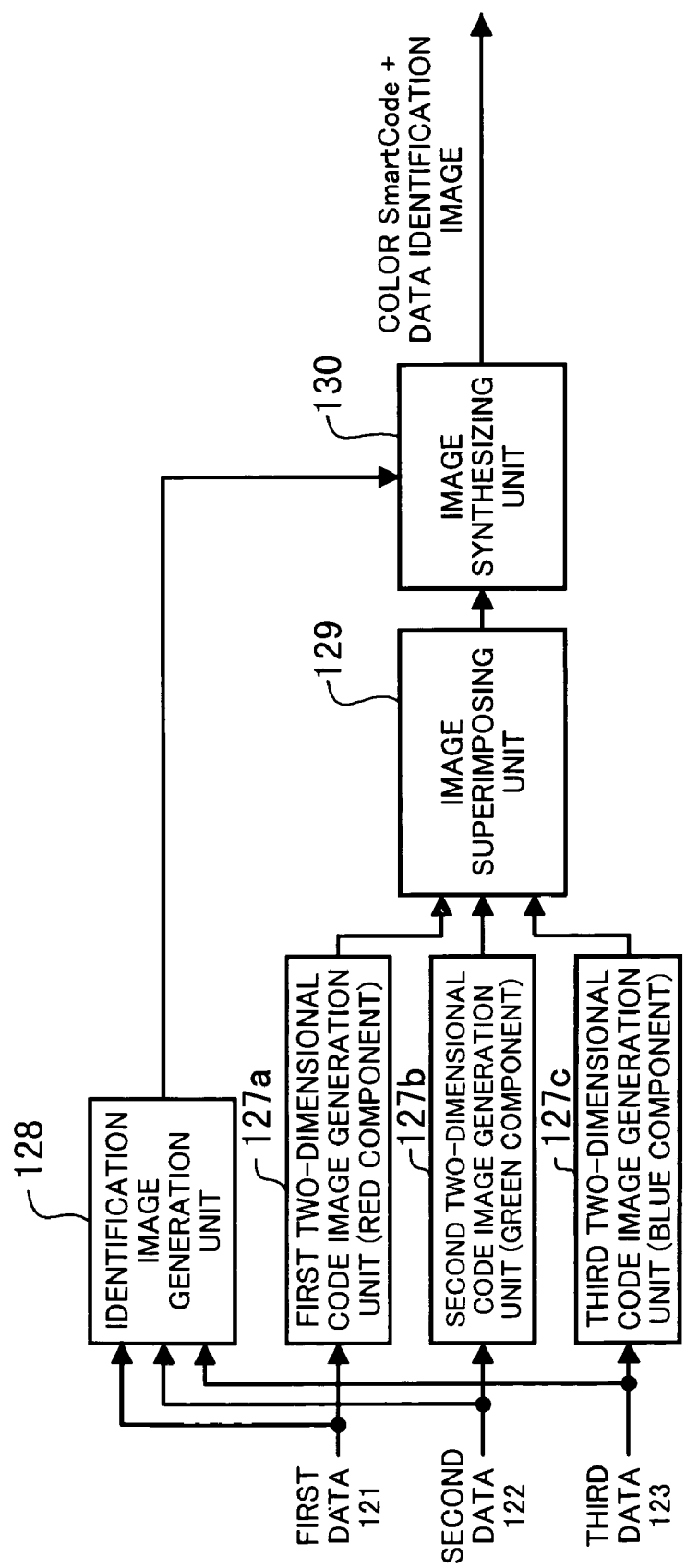
FIG. 18 is a diagram illustrating an example of the construction of a print information processing unit which generates data of an image to be printed on a print medium in the seventh embodiment.

FIG. 18 is a diagram illustrating an example of the construction of a print information processing unit which generates data of an image to be printed on a print medium in the seventh embodiment. The print information processing unit of FIG. 18 comprises a first two-dimensional code image generation unit 127a, a second two-dimensional code image generation unit 127b, a third two-dimensional code image generation unit 127c, an image superimposing unit 129, and an image synthesizing unit 130. The first two-dimensional code image generation unit 127a inputs the first data 121, and encodes the first data 121 to produce a first two-dimensional code image (e.g., a first SmartCode) representing the first item 121. The second two-dimensional code image generation unit 127b inputs the second data 122, and encodes the second data 122 to produce a second two-dimensional code image (e.g., a second SmartCode) representing the second data 122. The third two-dimensional code image generation unit 127a inputs the third data 123, and encodes the third data 123 to produce a third two-dimensional code image (e.g., a third SmartCode) representing the third data 123. The image superimposing unit 129 uses the first, second, and third two-dimensional code images as images of the red, green, and blue components, respectively, and generates image data of a superimposed two-dimensional code image of the first, second, and third two-dimensional code images. For example, when the first, second, and third two-dimensional code images are each represented by a binary SmartCode having an identical size, a color SmartCode composed of the red, green, and blue, binary SmartCodes is produced as the above superimposed two-dimensional code image. The identification image generation unit 128 generates identification images 125a, 125b, and 125c for use in identifying the first, second, and third data 121, 122, and 123, respectively. The first, second, and third identification images 125a, 125b, and 125c may be different patterns, or identical patterns of different colors. The image synthesizing unit 130 synthesizes the above superimposed two-dimensional code image (e.g., the color SmartCode) generated by the image superimposing unit 129 and the first, second, and third identification images 125a, 125b, and 125c generated by the identification image generation unit 128 so that the first, second, and third identification images 125a, 125b, and 125c are attached to the superimposed image. Thus, an integrated image of the superimposed two-dimensional code image and the first, second, and third identification images 125a, 125b, and 125c is obtained. The synthesized result is output as the image data to be printed.

(12) Scanning Direction and Image

FIGS. 19(A) to 19(J) are diagrams provided for explaining relationships between the main scanning directions of the images generated in the sixth or seventh embodiment, moving (sweeping) directions of a handheld scanner, and images obtained by the scanning. In each of FIGS. 19(A) to 19(J), the hatched, blank, and black bars are the aforementioned first, second, and third identification images, respectively, and it is assumed that the aforementioned (superimposed) two-dimensional code image exists in the blank area surrounded by the hatched, blank, and black bars. FIGS. 19(A) and 19(F) show eight possible ways (1) to (8) of scanning. In FIGS. 19(A) and 19(F), the reference numeral 131 denotes a handheld scanner, and the blank circle in the scanner 131 indicates the start position of main scanning along a line sensor provided in the handheld scanner 131.

When the scanner 131 is at rest on an image printed in the sixth or seventh embodiment, a one-dimensional image is obtained by the main scanning along the line sensor. A two-dimensional image is obtained by moving (sweeping) the scanner 131 in the direction perpendicular to the main scanning direction. In the scanner 131, the main scanning is performed from the position indicated by the blank circle. Therefore, the image obtained by scanning is different when the start position of the main scanning is different even if the moving direction of the scanner is identical. Thus, the eight different images as illustrated in FIGS. 19(B) to 19(E) and FIGS. 19(G) to 19(J) can be obtained corresponding to the directions (i.e., the starting positions) of main scanning and the moving directions of the scanner.

FIGS. 19(B) to 19(E) show the images obtained by scanning the (superimposed) two-dimensional code image when the starting positions of the main scanning are as illustrated by the blank circles in FIG. 19(A). FIG. 19(B) shows the image obtained by scanning the (superimposed) two-dimensional code image in the direction from the top to the bottom of the two-dimensional code image; FIG. 19(C) shows the image obtained by scanning the (superimposed) two-dimensional code image in the direction from the bottom to the top of the two-dimensional code image; FIG. 19(D) shows the image obtained by scanning the (superimposed) two-dimensional code image in the direction from the left side to the right side of the two-dimensional code image; and FIG. 19(E) shows the image obtained by scanning the (superimposed) two-dimensional code image in the direction from the right side to the left side of the two-dimensional code image.

FIGS. 19(G) to 19(J) show the images obtained by scanning the (superimposed) two-dimensional code image when the starting positions of the main scanning are as illustrated by the blank circles in FIG. 19(F). FIG. 19(G) shows the image obtained by scanning the (superimposed) two-dimensional code image in the direction from the top to the bottom of the two-dimensional code image; FIG. 19(H) shows the image obtained by scanning the (superimposed) two-dimensional code image in the direction from the bottom to the top of the two-dimensional code image; FIG. 19(I) shows the image obtained by scanning the (superimposed) two-dimensional code image in the direction from the left side to the right side of the two-dimensional code image; and FIG. 19(J) shows the image obtained by scanning the (superimposed) two-dimensional code image in the direction from the right side to the left side of the two-dimensional code image.

Since each of the eight different images illustrated in FIGS. 19(B) to 19(E) and FIGS. 19(G) to 19(J) is uniquely determined by the direction (i.e., the starting position) of main scanning and the moving direction of the scanner, the direction (i.e., the starting position) of main scanning and the moving direction of the scanner can be recognized based on the image obtained by scanning. Therefore, even when the image obtained by scanning is one of the images illustrated in FIGS. 19(C) to 19(E) and FIGS. 19(G) to 19(J), the image obtained by scanning can be automatically corrected to the positionally correct image as illustrated in FIG. 19(B) by rotation and mirroring. Thus, the (superimposed) two-dimensional code image can be correctly decoded regardless of the direction (i.e., the starting position) of main scanning and the moving direction of the scanner.

In addition, it is possible to select and obtain specific data from an image printed in the sixth or seventh embodiment, based on correspondence between data and the directions of scanning.

Although the above explanation is provided for the case wherein a handheld scanner is used for scanning, the images illustrated in FIGS. 19(B) to 19(E) and FIGS. 19(G) to 19(J) include all of the possible images obtained by scanning the (superimposed) two-dimensional code image with a flat-bed scanner or a digital still camera. Therefore, even in the case wherein a flat-bed scanner or a digital still camera is used for reading the two-dimensional code image, the (superimposed) two-dimensional code image can be correctly decoded in a similar manner to the case of the handheld scanner, regardless of the orientation of the two-dimensional code image placed on a document table of the flat-bed scanner, or the position of the digital still camera.

(13) Eighth Embodiment

Figure 20:
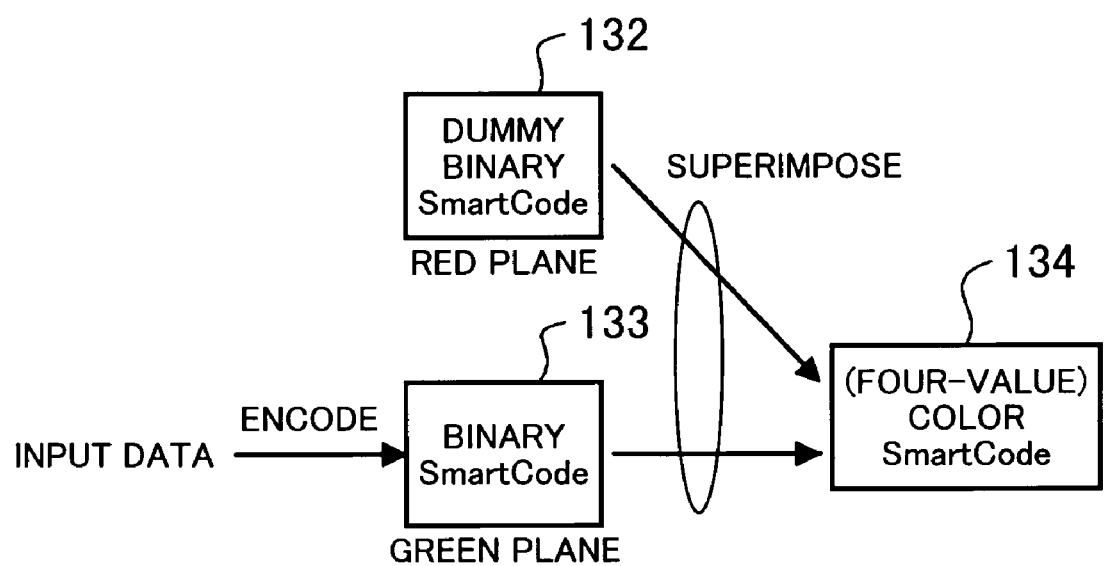
FIG. 20 is a diagram illustrating the operation of printing a human-readable image and a two-dimensional code image together on a print medium in the eighth embodiment.

FIG. 20 is a diagram illustrating the operation of printing a human-readable image and a two-dimensional code image together on a print medium in the eighth embodiment. In the eighth embodiment, a two-dimensional code image (e.g., two-dimensional code) is printed so that the two-dimensional code image can be read only when that is scanned with specific scanning light.

In the eighth embodiment, first, a dummy two-dimensional code image is generated based on random data, and is printed in a color which is identical with the color of the scanning light used in the print image recording apparatus. On the other hand, real data is encoded to produce a real two-dimensional code image, and is printed in a color which is complementary to the color of the above scanning light, so that the real two-dimensional code image is superimposed on the dummy two-dimensional code image. For example, when the color of the scanning light is red, a dummy binary SmartCode is generated on the red plane 132. On the other hand, the real data is encoded to produce a real binary SmartCode on the green plane 133. Then, the real binary SmartCode is superimposed on the dummy binary SmartCode to produce a quaternary (four-value) color SmartCode 134.

When the above superimposed two-dimensional code image (e.g., the quaternary color SmartCode 134) is scanned with scanning light of a color which is different from the color of the dummy two-dimensional code image, the dummy two-dimensional code image is read together with the real two-dimensional code image. Therefore, it is difficult to correctly read the real two-dimensional code image by using the scanning light of the color which is different from the color of the dummy two-dimensional code image. On the other hand, when the superimposed two-dimensional code image (e.g., the quaternary color SmartCode 134) is scanned with scanning light of the same color as the dummy two-dimensional code image, only the real two-dimensional code image is read since the real two-dimensional code is printed in the color complementary to the color of the dummy two-dimensional code image. Thus, in the case wherein a superimposed two-dimensional code image of a real two-dimensional code image and a dummy two-dimensional code image are printed on a sheet of paper, and the colors of the real and dummy two-dimensional code images are different, the real two-dimensional code image can be correctly read only when the sheet of paper is scanned with scanning light of a specific color.

Figure 21:
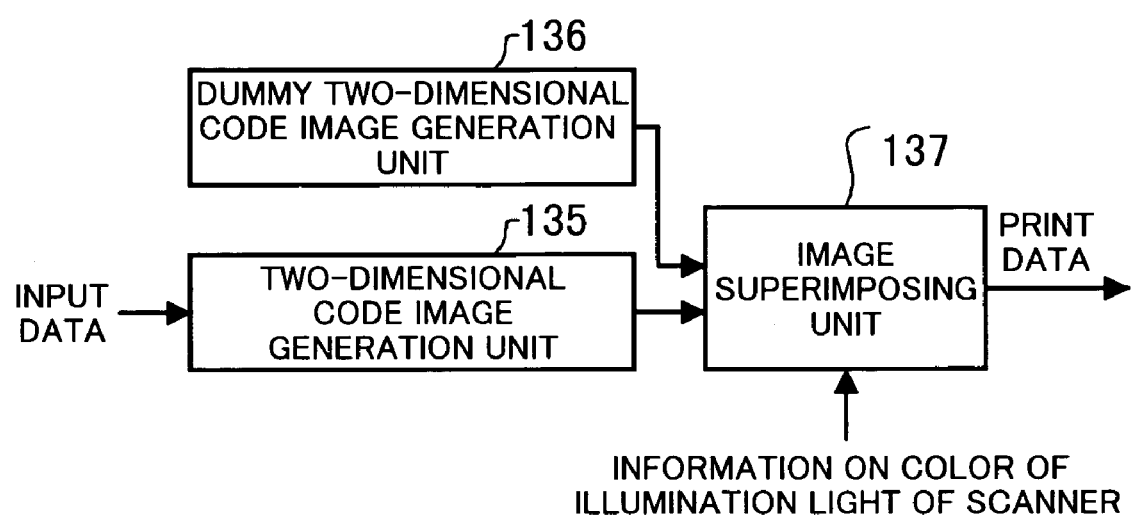
FIG. 21 is a diagram illustrating an example of the construction of a print information processing unit which generates data of an image to be printed on a print medium in the eighth embodiment.

FIG. 21 is a diagram illustrating an example of the construction of a print information processing unit which generates data of an image to be printed on a print medium in the eighth embodiment. The print information processing unit of FIG. 21 comprises a real two-dimensional code image generation unit 135, a dummy two-dimensional code image generation unit 136, and an image superimposing unit 137. The real two-dimensional code image generation unit 135 inputs and encodes input data to produce a real two-dimensional code image (e.g., a real SmartCode) representing the input data. The dummy two-dimensional code image generation unit 136 generates a dummy two-dimensional code image based on random data. The image superimposing unit 137 assigns the same color as the scanning light to the dummy two-dimensional code image, and a complementary color to the color of the scanning light to the real two-dimensional code image. Then, the image superimposing unit 137 superimposes the dummy two-dimensional code image on the real two-dimensional code image, and outputs image data of the superimposed image. The output of the image superimposing unit 137 is supplied to a printing device to print the superimposed image on a sheet of paper.

(14) Ninth Embodiment

In the ninth embodiment, the size of a human-readable image which is superimposed on a two-dimensional code image is appropriately adjusted so that the superimposed two-dimensional code can be decoded.

Figure 22:
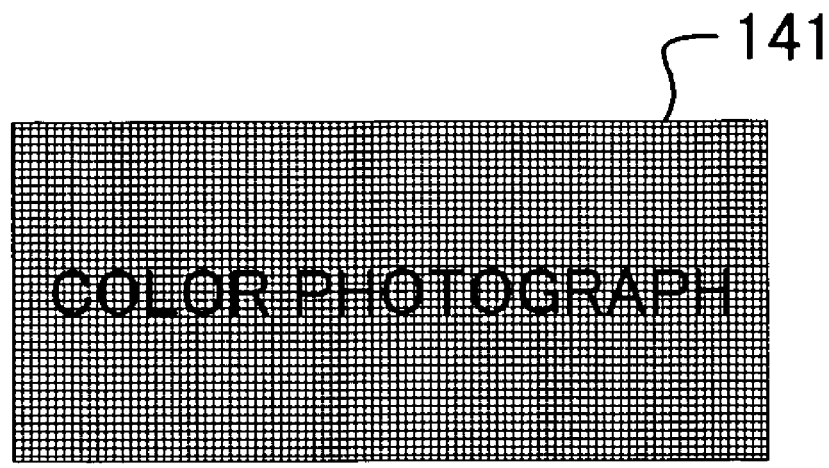
FIG. 22(A) shows an example of a superimposed image from which a two-dimensional code image cannot be read.
FIG. 22(B) shows an example of a superimposed image from which a two-dimensional code image can be read.
Figure 22:
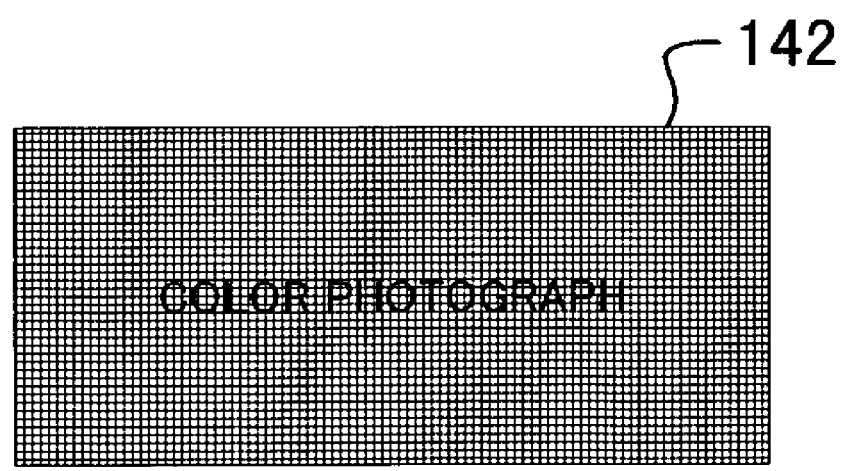

FIG. 22(A) shows an example of a superimposed image from which a two-dimensional code image cannot be read, and FIG. 22(B) shows an example of a superimposed image from which a two-dimensional code image can be read. In the superimposed image of FIG. 22(A), the human-readable character image which is superimposed on the two-dimensional code image contains so thick line elements that a considerable portion of the two-dimensional code image is hidden by the line elements, and decodability of the two-dimensional code cannot be guaranteed.

Generally, two-dimensional codes such as the SmartCode include redundancies as provision against possible errors in reading by a scanner, transmission by facsimile, and the like, so that original data represented by the two-dimensional codes can be reproduced even if portions of the two-dimensional codes are damaged. However, when the degree of the damage to the two-dimensional code is too great, the two-dimensional code cannot be reproduced.

For example, when decoding a SmartCode on which a human-readable image of characters of a color similar to the color of the SmartCode is superimposed, the human-readable image of characters is treated as noise. Therefore, when the size of the characters is large, or when the thickness of the line elements constituting the characters is great, as illustrated in FIG. 22(A), it is difficult to decode the SmartCode.

According to the ninth embodiment, an attempt is made to decode a two-dimensional code image on which a human-readable image is superimposed, before printing the superimposed image. When the attempt fails, the size of the human-readable image is reduced, and the human-readable image having the reduced size is superimposed on the two-dimensional code image. Then, the above attempt is made again. The size reduction of the human-readable image is repeated until the above attempt succeeds. When the attempt succeeds, a superimposed image 142 of the reduced human-readable image and the two-dimensional code image is printed, as illustrated in FIG. 22(B).

Figure 23:
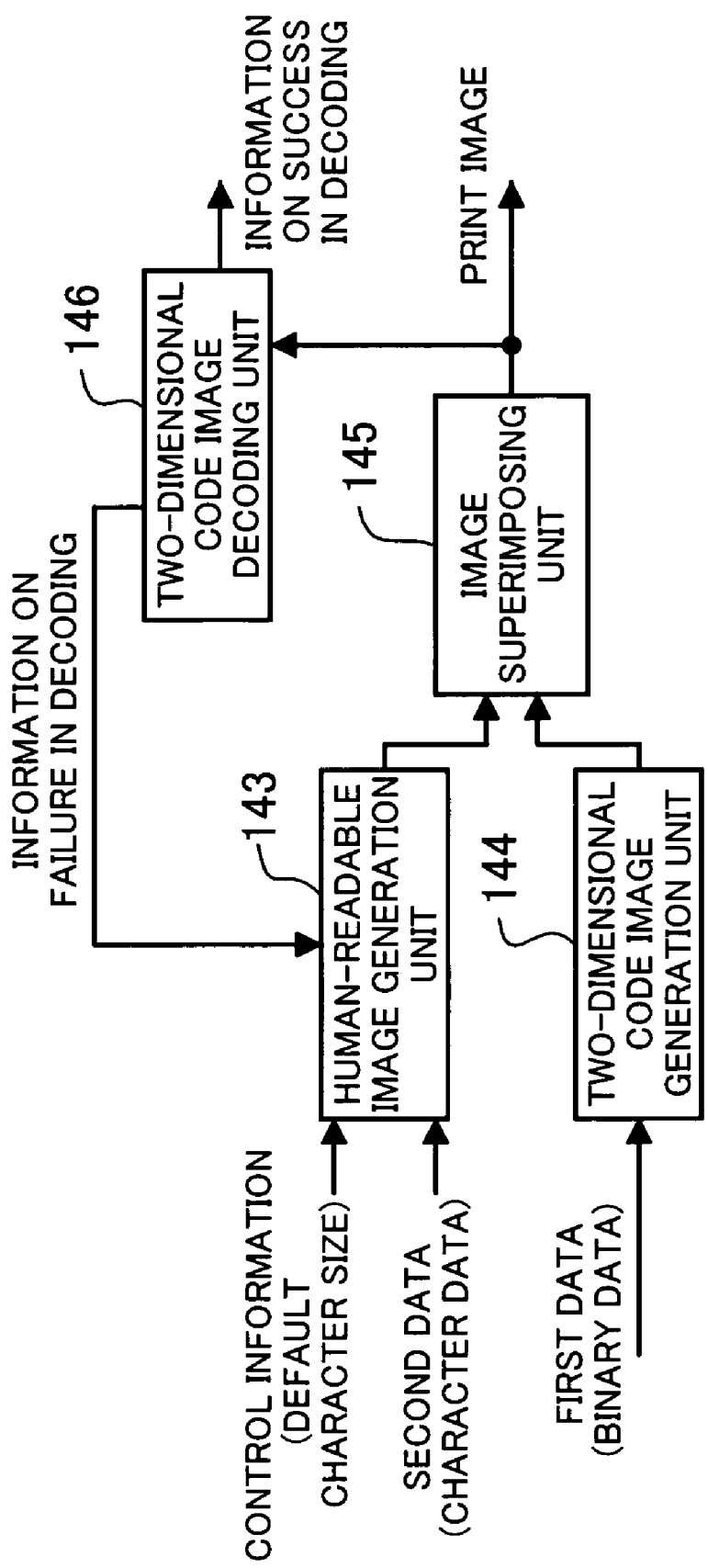
FIG. 23 is a diagram illustrating an example of the construction of a print information processing unit which generates data of an image to be printed on a print medium in the eighth embodiment.
Figure 24:
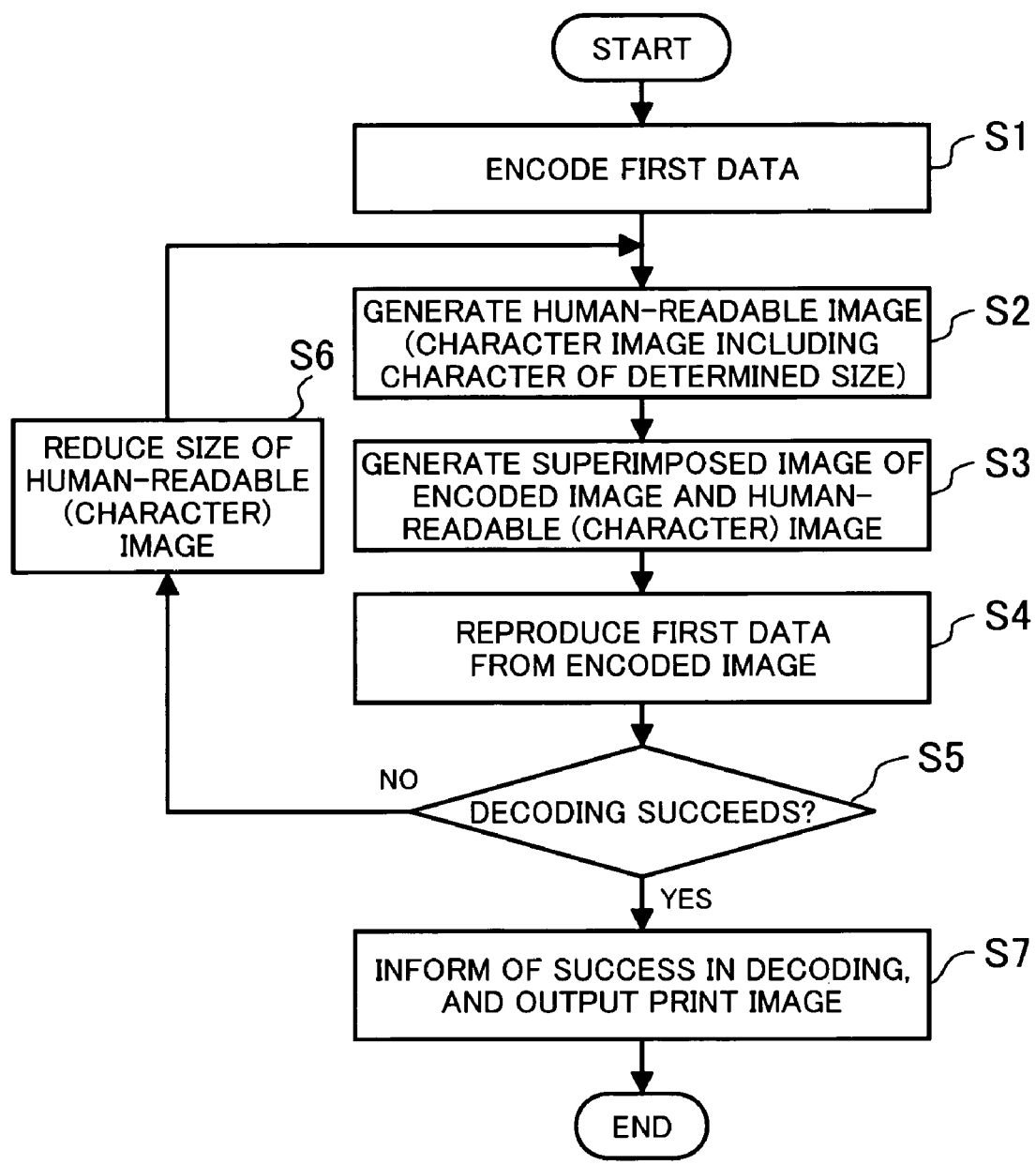
FIG. 24 is a flowchart of the operations performed in the print information processing unit illustrated in FIG. 23.

FIG. 23 is a diagram illustrating an example of the construction of a print information processing unit which generates data of an image to be printed on a print medium in the eighth embodiment, and FIG. 24 is a flowchart of the operations performed in the print information processing unit illustrated in FIG. 23. The print information processing unit of FIG. 23 comprises a human-readable image generation unit 143, a two-dimensional code image generation unit 144, an image superimposing unit 145, and a two-dimensional code image decoding unit 146.

In step S1 of FIG. 24, the two-dimensional code image generation unit 144 inputs first input data, and generates a two-dimensional code image representing the first input data. In step S2, the human-readable image generation unit 143 inputs second input data and control information indicating an initial (default) image size, and generates a human-readable image representing the second input data and having the initial (default) image size. For example, the human-readable image of the predetermined initial size may include character images of a predetermined initial size. In this case, the control information may indicates an initial (default) size of characters in the character image. In step S3, the image superimposing unit 145 superimposes the human-readable image on the two-dimensional code image, and outputs image data of a superimposed image. In step S4, the two-dimensional code image decoding unit 146 receives the image data output from the image superimposing unit 145, and makes an attempt to decode the two-dimensional code image on which the human-readable image is superimposed. When the attempt fails, the two-dimensional code image decoding unit 146 informs the human-readable image generation unit 143 of the failure in the attempt (in step S5). When the human-readable image generation unit 143 receives information on the failure in the attempt, the human-readable image generation unit 143 generates another human-readable image representing the second input data and having a reduced size (in step S6). For example, the size reduction is made so that the point sizes of character images included in the human-readable image are changed from 18 to 16. Then, the image superimposing unit 145 superimposes the human-readable image having the reduced size on the two-dimensional code image (in step S3), and outputs image data of a superimposed image including the human-readable image having the reduced size. The two-dimensional code image decoding unit 146 makes an attempt again to decode the two-dimensional code image on which the human-readable image having the reduced size is superimposed (in step S4). When the attempt fails, the above operations including the size reduction of the human-readable image, the superimposition, and the attempt by the two-dimensional code image decoding unit 146 (in steps S6, S2, S3, S4, and S5) are repeated until the attempt succeeds. When the attempt succeeds, the two-dimensional code image decoding unit 146 outputs information on the success, and the image data of the superimposed image is supplied to a printing device to print the superimposed image (in step S7).

(15) Other Matters

Although, in the above embodiments, the printed images are mainly read by a scanner, the printed images may be read by other means such as a digital still camera.

In addition, the functions of the print data recording apparatus according to the present invention, including the functions realizing the above first to ninth operations, may be realized by using a certain product with a print data recording apparatus, e.g., by installing a computer-readable medium in a computer. The product is such that when the product is used with the print data recording apparatus (e.g., a computer), the product is able to output control information which directs the print information processing apparatus to realize any of the above functions of the present invention including the functions realizing the above first to ninth operations. The product may be a semiconductor storage device storing a program which realizes the above functions, such as a ROM, or a magnetic storage medium such as a floppy disc or a hard disk, or a CD-ROM, a CD-R, a DVD-ROM, a DVD-RAM, a DVD-R, or the like. Further, the above product may be a programmed hardware logic circuit such as an LSI. The above product can be put into the market. Alternatively, program data realizing the above functions may be transferred through a communication network from a storage device included in a computer system to another computer system. When executing the program in a computer system, for example, the program stored in a hard disk drive may be loaded in a main memory of the computer system.

Further, all of the contents of the Japanese patent application, No.11-156209 are incorporated into this specification by reference.

What is claimed is:

1. A print information processing system comprising a print data recording apparatus and a print data reproducing apparatus;
   said print data recording apparatus includes,
   a human-readable image generation unit which generates a human-readable image representing first data,
   a two-dimensional code image generation unit which generates a two-dimensional code image representing second data,
   a print data generation unit which combines said human-readable image and said two-dimensional code image to generate print data, and
   a printing unit which prints said print data on a print medium;
   said print data reproducing apparatus includes,
   a reading unit which reads said two-dimensional code image included in said print data printed on said print medium, and
   a print data decoding unit which decodes said two-dimensional code image read by said reading unit, to reproduce said second data,
   wherein said print data generation unit superimposes said human-readable image and said two-dimensional code image to generate said print data, wherein said print data generation unit superimposes said human-readable image on said two-dimensional code image to generate said print data, where different colors are assigned to the human-readable image and the two-dimensional code image, and
   wherein a first and second colors are assigned to said human-readable image and said two-dimensional code image, respectively, where said first color is similar to a third color of light with which said print medium is illuminated when said reading unit reads said two-dimensional code image.

2. A print information processing system comprising a print data recording apparatus and a print data reproducing apparatus;
   said print data recording apparatus includes,
   a human-readable image generation unit which generates a human-readable image representing first data,
   a two-dimensional code image generation unit which generates a two-dimensional code image representing second data,
   a print data generation unit which combines said human-readable image and said two-dimensional code image to generate print data, and
   a printing unit which prints said print data on a print medium;
   said print data reproducing apparatus includes,
   a reading unit which reads said two-dimensional code image included in said print data printed on said print medium, and
   a print data decoding unit which decodes said two-dimensional code image read by said reading unit, to reproduce said second data,
   wherein said print data recording comprises a data division unit which divides third data into first and second portions, supplies as said first data the first portion of the third data to said human-readable image generation unit, and supplies as said second data the second portion of the third data to said two-dimensional code image generation unit.

3. A print information processing system according to claim 2, wherein said data division unit determines said first and second portions of the third data by dividing said third data into N subportions, choosing M subportions from among the N subportions as constituents of the first portion of the third data, and choosing (N–M) subportions from among the N subportions as constituents of the second portion of the third data, where $N \geq 2$, $1 \leq M \leq N-1$, and said M subportions and said (N–M) subportions do not overlap.

4. A print information processing system comprising a print data recording apparatus and a print data reproducing apparatus;
   said print data recording apparatus includes,
   a human-readable image generation unit which generates a human-readable image representing first data,
   a two-dimensional code image generation unit which generates a two-dimensional code image representing second data,
   a print data generation unit which combines said human-readable image and said two-dimensional code image to generate print data, and
   a printing unit which prints said print data on a print medium;
   said print data reproducing apparatus includes,
   a reading unit which reads said two-dimensional code image included in said print data printed on said print medium, and
   a print data decoding unit which decodes said two-dimensional code image read by said reading unit, to reproduce said second data,
   wherein said two-dimensional code image generation unit comprises a plurality of color-component two-dimensional code image generation units which generate a plurality of two-dimensional code images to which a plurality of separable color components are assigned, respectively, where the plurality of two-dimensional code images represent a plurality of data items, respectively,
   wherein said print data recording apparatus further comprises an identification image generation unit which generates a plurality of identification images respectively provided for identifying said plurality of two-dimensional code images, and
   said print data generation unit generates said print data by superimposing said plurality of two-dimensional code images to produce a superimposed image, and synthesizing the superimposed image and the plurality of identification images.

5. A print information processing system according to claim 4, wherein said print data generation unit rotates each of the plurality of two-dimensional code images so that said each of the plurality of two-dimensional code images is oriented in a direction in which said reading unit reads said each of the plurality of two-dimensional code images, before superimposing said plurality of two-dimensional code images, and synthesizes said superimposed image and said plurality of identification images so that one of said plurality of identification images corresponding to each of the plurality of two-dimensional code images is arranged on an upstream side of said each of the plurality of two-dimensional code images in said direction.

6. A print information processing system comprising a print data recording apparatus and a print data reproducing apparatus;
   said print data recording apparatus includes,
   a human-readable image generation unit which generates a human-readable image representing first data,
   a two-dimensional code image generation unit which generates a two-dimensional code image representing second data,
   a print data generation unit which combines said human-readable image and said two-dimensional code image to generate print data, and
   a printing unit which prints said print data on a print medium;
   said print data reproducing apparatus includes,
   a reading unit which reads said two-dimensional code image included in said print data printed on said print medium, and
   a print data decoding unit which decodes said two-dimensional code image read by said reading unit, to reproduce said second data,
   wherein said second data include a plurality of data items,
   said print data recording apparatus further comprises an identification image generation unit which generates a plurality of identification images provided for use in selecting one of said plurality of data items as a data item to be decoded from said two-dimensional code image by said print data decoding unit, and
   said print data generation unit encodes said plurality of data items to produce a monochrome two-dimensional code image as said two-dimensional code image, and synthesizes said monochrome two-dimensional code image and said plurality of identification images to generate said print data.

7. A print information processing system comprising a print data recording apparatus and a print data reproducing apparatus;
   said print data recording apparatus includes,
   a human-readable image generation unit which generates a human-readable image representing first data,
   a two-dimensional code image generation unit which generates a two-dimensional code image representing second data,
   a print data generation unit which combines said human-readable image and said two-dimensional code image to generate print data, and
   a printing unit which prints said print data on a print medium;
   said print data reproducing apparatus includes,
   a reading unit which reads said two-dimensional code image included in said print data printed on said print medium, and
   a print data decoding unit which decodes said two-dimensional code image read by said reading unit, to reproduce said second data,
   wherein said two-dimensional code image generation unit comprises a plurality of color-component two-dimensional code image generation units which generate a plurality of two-dimensional code images to which a plurality of separable color components are assigned, respectively, where the plurality of two-dimensional code images represent a plurality of data items, respectively, and
   wherein said print data recording apparatus further comprises a dummy two-dimensional code image generation unit which generates a dummy two-dimensional code image which is independent of said second data, and to which a first color is assigned, where the first color is similar to a second color of light with which said print medium is illuminated when said reading unit reads said two-dimensional code image.

8. A print information processing system comprising a print data recording apparatus and a print data reproducing apparatus;
   said print data recording apparatus includes,
   a human-readable image generation unit which generates a human-readable image representing first data,
   a two-dimensional code image generation unit which generates a two-dimensional code image representing second data,
   a print data generation unit which combines said human-readable image and said two-dimensional code image to generate print data, and
   a printing unit which prints said print data on a print medium;
   said print data reproducing apparatus includes,
   a reading unit which reads said two-dimensional code image included in said print data printed on said print medium, and
   a print data decoding unit which decodes said two-dimensional code image read by said reading unit, to reproduce said second data,
   wherein said print data generation unit superimposes said human-readable image and said two-dimensional code image to generate said print data, and
   wherein said print data recording apparatus further comprises a decodability determining unit which makes an attempt to decode the two-dimensional code image before supplying said print data to said printing unit, makes the human-readable image generation unit generate another human-readable image having a reduced size when the attempt fails, and determines that said print data can be supplied to said printing unit, when the attempt succeeds.

9. A print data recording apparatus comprising:
   a human-readable image generation unit which generates a human-readable image representing first data;
   a two-dimensional code image generation unit, which generates a two-dimensional code image representing second data;
   a print data generation unit which combines said human-readable image and said two-dimensional code image to generate print data; and
   a printing unit which prints said print data on a print medium,
   wherein said print data generation unit superimposes said human-readable image and said two-dimensional code image to generate said print data,
   wherein said print data generation unit superimposes said human-readable image on said two-dimensional code image to generate said print data, where a first and second colors are assigned to the human-readable image and the two-dimensional code image, respectively, and the first and second colors are different, and wherein said first color is complementary to the second color.

10. A print data recording apparatus comprising:
a human-readable image generation unit which generates a human-readable image representing first data;
a two-dimensional code image generation unit, which generates a two-dimensional code image representing second data;
a print data generation unit which combines said human-readable image and said two-dimensional code image to generate print data;
a printing unit which prints said print data on a print medium; and
a data division unit which divides third data into first and second portions, supplies as said first data the first portion of the third data to said human-readable image generation unit, and supplies as said second data the second portion of the third data to said two-dimensional code image generation unit.

11. A print data recording apparatus according to claim 10, wherein said data division unit determines first and second portions of the third data by dividing said third data into N subportions, choosing M subportions form among the N subportions as constituents of the first portion of the third data, and choosing (N–M) subportions from among the N subportions as constituents of the second portion of the third data, where $N \geq 2$, $1 \leq M \leq N-1$, and said M subportions and said (N–M) subportions do not overlap.

12. A print data recording apparatus comprising:
a human-readable image generation unit which generates a human-readable image representing first data;
a two-dimensional code image generation unit, which generates a two-dimensional code image representing second data;
a print data generation unit which combines said human-readable image and said two-dimensional code image to generate print data;
a printing unit which prints said print data on a print medium,
wherein said two-dimensional code image generation unit comprises a plurality of color-component two-dimensional code image generation units which generate a plurality of two-dimensional code images to which a plurality of separable color components are assigned, respectively, where the plurality of two-dimensional code images represent a plurality of data items, respectively; and
an identification image generation unit which generates a plurality of identification images respectively provided for identifying said plurality of two-dimensional code images, and
said print data generation unit generates said print data by superimposing said plurality of two-dimensional code images to produce a superimposed image, and synthesizing the superimposed image and the plurality of identification images.

13. A print data recording apparatus according to claim 12, wherein said print data generation unit rotates each of the plurality of two-dimensional code images so that said each of the plurality of two-dimensional code images is oriented in a direction in which said each of the plurality of two-dimensional code images is to be read, before superimposing said plurality of two-dimensional code images, and synthesizes said superimposed image and said plurality of identification images so that one of said plurality of identification images corresponding to each of the plurality of two-dimensional code images is arranged on an upstream side of said each of the plurality of two-dimensional code images in said direction.

14. A print data recording apparatus comprising:
a human-readable image generation unit which generates a human-readable image representing first data;
a two-dimensional code image generation unit, which generates a two-dimensional code image representing second data;
a print data generation unit which combines said human-readable image and said two-dimensional code image to generate print data; and
a printing unit which prints said print data on a print medium,
wherein said second data include a plurality of data items,
said print data recording apparatus further comprises an identification image generation unit which generates a plurality of identification images provided for use in selecting one of said plurality of data items as a data item to be decoded from said two-dimensional code image, and
said print data generation unit encodes said plurality of data items to produce a monochrome two-dimensional code image as said two-dimensional code image, and synthesizes said monochrome two-dimensional code image and said plurality of identification images to generate said print data.

15. A print data recording apparatus comprising:
a human-readable image generation unit which generates a human-readable image representing first data;
a two-dimensional code image generation unit, which generates a two-dimensional code image representing second data;
a print data generation unit which combines said human-readable image and said two-dimensional code image to generate print data;
a printing unit which prints said print data on a print medium,
wherein said two-dimensional code image generation unit comprises a plurality of color-component two-dimensional code image generation units which generate a plurality of two-dimensional code images to which a plurality of separable color components are assigned, respectively, where the plurality of two-dimensional code images represent a plurality of data items, respectively; and
a dummy two-dimensional code image generation unit which generates a dummy two-dimensional code image which is independent of said second data, and to which a first color is assigned, where the first color is similar to a second color of light with which said print medium is to be illuminated when said two-dimensional code image is read.

16. A print data recording apparatus comprising:
a human-readable image generation unit which generates a human-readable image representing first data;
a two-dimensional code image generation unit, which generates a two-dimensional code image representing second data;
a print data generation unit which combines said human-readable image and said two-dimensional code image to generate print data;
a printing unit which prints said print data on a print medium;
wherein said print data generation unit superimposes said human-readable image and said two-dimensional code image to generate said print data; and a decodability determining unit which makes an attempt to decode the two-dimensional code image, makes the human-readable image generation unit generate another human-readable image having a reduced size when the attempt fails, and determines that said print data can be supplied to said printing unit, when the attempt succeeds.

17. A computer readable medium including a product for use with a print data processing apparatus which processes input data which are to be printed as a two-dimensional code image and a human-readable image on a print medium,
said product, when used with said print data processing apparatus, is able to output control information which directs the print data processing apparatus including the input data to comprise:
a human-readable image generation unit which generates a human-readable image representing first data;
a two-dimensional code image generation unit which generates a two-dimensional code image representing second data; and
a print data generation unit which combines said human-readable image and said two-dimensional code image to generate print data,
wherein said print data generation unit superimposes said human-readable image on said two-dimensional code image to generate said print data, where a first and second colors are assigned to the human-readable image and the two-dimensional code image, respectively, and the first and second colors are different, and
wherein said first color is complementary to the second color.

18. A computer readable medium including a product for use with a print data processing apparatus which processes input data which are to be printed as a two-dimensional code image and a human-readable image on a print medium,
said product, when used with said print data processing apparatus, is able to output control information which directs the print data processing apparatus including the input data to comprise:
a human-readable image generation unit which generates a human-readable image representing first data;
a two-dimensional code image generation unit which generates a two-dimensional code image representing second data;
a print data generation unit which combines said human-readable image and said two-dimensional code image to generate print data; and
a data division unit which divides third data into first and second portions, supplies as said first data the first portion of the third data to said human-readable image generation unit, and supplies as said second data the second portion of the third data to said two-dimensional code image generation unit.

19. A computer readable medium according to claim 18, wherein said data division unit determines said first and second portions of the third data by dividing said third data into N subportions, choosing M subportions from among the N subportions as constituents of the first portion of the third data, and choosing (N–M) subportions from among the N subportions as constituents of the second portion of the third data, where $N \geq 2$, $1 \leq M \leq N-1$, and said M subportions and said (N–M) subportions do not overlap.

20. A computer readable medium including a product for use with a print data processing apparatus which processes input data which are to be printed as a two-dimensional code image and a human-readable image on a print medium,
said product, when used with said print data processing apparatus, is able to output control information which directs the print data processing apparatus including input data to comprise:
a human-readable image generation unit which generates a human-readable image representing first data;
a two-dimensional code image generation unit which generates a two-dimensional code image representing second data;
a print data generation unit which combines said human-readable image and said two-dimensional code image to generate print data,
wherein said two-dimensional code image generation unit comprises a plurality of color-component two-dimensional code image generation units which generate a plurality of two-dimensional code images to which a plurality of separable color components are assigned, respectively, where the plurality of two-dimensional code images represent a plurality of data items, respectively; and
an identification image generation unit which generates a plurality of identification images respectively provided for identifying said plurality of two-dimensional code images, and said print data generation unit generates said print data by superimposing said plurality of two-dimensional code images to produce a superimposed image, and synthesizing the superimposed image and the plurality of identification images.

21. A computer readable medium according to claim 20, wherein said print data generation unit rotates each of the plurality of two-dimensional code images so that said each of the plurality of two-dimensional code images is oriented in a direction in which said each of the plurality of two-dimensional code images is to be read, before superimposing said plurality of two-dimensional code images, and synthesizes said superimposed image and said plurality of identification images so that one of said plurality of identification images corresponding to each of the plurality of two-dimensional code images is arranged on an upstream side of said each of the plurality of two-dimensional code images in said direction.

22. A computer readable medium including a product for use with a print data processing apparatus which processes input data which are to be printed as a two-dimensional code image and a human-readable image on a print medium,
said product, when used with said print data processing apparatus, is able to output control information which directs the print data processing apparatus including input data to comprise:
a human-readable image generation unit which generates a human-readable image representing first data;
a two-dimensional code image generation unit which generates a two-dimensional code image representing second data; and
a print data generation unit which combines said human-readable image and said two-dimensional code image to generate print data,
wherein said second data include a plurality of data items,
said print data processing apparatus further comprises an identification image generation unit which generates a plurality of identification images provided for use in selecting one of said plurality of data items as a data item to be decoded from said two-dimensional code image, and
said print data generation unit encodes said plurality of data items to produce a monochrome two-dimensional code image as said two-dimensional code image, and synthesizes said monochrome two-dimensional code image and said plurality of identification images to generate said print data.

23. A computer readable medium including a product for use with a print data processing apparatus which processes input data which are to be printed as a two-dimensional code image and a human-readable image on a print medium, said product, when used with said print data processing apparatus, is able to output control information which directs the print data processing apparatus including input data to comprise:

a human-readable image generation unit which generates a human-readable image representing first data;

a two-dimensional code image generation unit which generates a two-dimensional code image representing second data;

a print data generation unit which combines said human-readable image and said two-dimensional code image to generate print data, wherein said two-dimensional code image generation unit comprises a plurality of color-component two-dimensional code image generation units which generate a plurality of two-dimensional code images to which a plurality of separable color components are assigned, respectively, where the plurality of two-dimensional code images represent a plurality of data items, respectively; and a dummy two-dimensional code image generation unit which generates a dummy two-dimensional code image which is independent of said second data, and to which a first color is assigned, where the first color is similar to a second color of light with which said print medium is to be illuminated when said two-dimensional code image is read.

24. A computer readable medium including a product for use with a print data processing apparatus which processes input data which are to be printed as a two-dimensional code image and a human-readable image on a print medium, said product, when used with said print data processing apparatus, is able to output control information which directs the print data processing apparatus including input data to comprise:

a human-readable image generation unit which generates a human-readable image representing first data;

a two-dimensional code image generation unit which generates a two-dimensional code image representing second data;

a print data generation unit which combines said human-readable image and said two-dimensional code image to generate print data, wherein said print data generation unit superimposes said human-readable image and said two-dimensional code image to generate said print data; and a decodability determining unit which makes an attempt to decode the two-dimensional code image, makes the human-readable image generation unit generate another human-readable image having a reduced size when the attempt fails, and determines that said print data can be supplied to said printing unit, when the attempt succeeds.

* * * * *